(12) United States Patent  
Hyland

(10) Patent No.: US 12,126,401 B2  
(45) Date of Patent: Oct. 22, 2024

(54) COMPACT SURVEILLANCE SYSTEM

(71) Applicant: Brendan Hyland, Edinburgh (GB)

(72) Inventor: Brendan Hyland, Edinburgh (GB)

(*) Notice: Subject to any disclaimer, the term of this patent is extended or adjusted under 35 U.S.C. 154(b) by 0 days.

(21) Appl. No.: 17/412,227

(22) Filed: Aug. 25, 2021

(65) Prior Publication Data

US 2023/0061059 A1    Mar. 2, 2023

(51) Int. Cl.
| | | |
|---|---|---|
| *H04B 5/00* | (2006.01) | |
| *H02J 50/00* | (2016.01) | |
| *H02J 50/10* | (2016.01) | |
| *H02J 50/27* | (2016.01) | |
| *H04B 11/00* | (2006.01) | |

(52) U.S. Cl.
CPC ......... *H04B 5/0031* (2013.01); *H04B 5/0075* (2013.01)

(58) Field of Classification Search
None
See application file for complete search history.

(56) References Cited

U.S. PATENT DOCUMENTS

| | | | | |
|---|---|---|---|---|
| 4,057,778 A * | 11/1977 | Bates | ............... | G01S 7/52004 367/13 |
| 7,139,223 B1 * | 11/2006 | Scarzello | ........... | G01D 5/353 367/149 |
| 7,149,150 B1 * | 12/2006 | Scarzello | ............. | B63G 7/02 367/149 |
| 7,343,261 B1 * | 3/2008 | Kell | ...................... | G01P 5/07 43/17 |
| 8,305,227 B2 * | 11/2012 | Jaffrey | ............... | H04B 13/02 340/852 |
| 8,531,918 B2 * | 9/2013 | Rhodes | ................ | H01Q 1/04 367/131 |
| 8,537,639 B2 * | 9/2013 | Rhodes | ................ | H01Q 1/04 367/131 |

(Continued)

*Primary Examiner* — Tuan A Tran

(57) ABSTRACT

A near field compact surveillance system that includes: a power source configured to provide power to the system; a power input coupled to the power source and configured to provide power to the system; one or more sensors configured to measure a measurand; a Loosely Coupled Transformer (LCT) transducer coupled to the one or more sensors and the power source, the LCT configured to receive an external signal and convert the external signal to an electrical signal; a processor in electrical or magnetic communication with the one or more sensors, the processor configured to process the electrical signal, generate information relative to one or more of progress against predictive behaviour of selected from one or more of: corrosion; fatigue; temperature; flow and environment; a modulator for modulating information onto a carrier signal, the modulator coupled to the processor; a radio for transmitting information to a remote receiver, the radio being coupled to the LCT; a remote receiver antenna coupled to the LCT; a power-saving transducer circuit coupled to the LCT; and at least one of the transmitter and the receiver being operable to communicate within near field, the near field of the electromagnetic and magnetic signals corresponding to a region around the LCT where the field strength corresponds to ear where a is a corrected for the medium save in a vacuum is the value of an integer.

18 Claims, 5 Drawing Sheets

(56) References Cited

U.S. PATENT DOCUMENTS

| | | | | |
|---|---|---|---|---|
| 8,575,929 B1* | 11/2013 | Wiegert | ............. | G01R 33/0206 324/245 |
| 8,576,667 B2* | 11/2013 | Rhodes | ................. | H04B 13/02 367/131 |
| 8,576,668 B2* | 11/2013 | Rhodes | ................. | H04B 13/02 367/131 |
| 8,581,741 B2* | 11/2013 | Simpson | ............. | E21B 33/0355 340/854.6 |
| 8,654,189 B1* | 2/2014 | Spangler | ............... | H04N 7/183 348/81 |
| 8,708,052 B2* | 4/2014 | Radi | ....................... | E21B 44/00 702/6 |
| 8,723,355 B2* | 5/2014 | Eder | ...................... | F03B 13/16 290/43 |
| 9,384,447 B2* | 7/2016 | Forero | ................... | G06F 17/14 |
| 9,669,912 B2* | 6/2017 | Hesse | ..................... | B63G 8/42 |
| 9,866,340 B2* | 1/2018 | Ahola | ................ | H04W 56/002 |
| 9,869,752 B1* | 1/2018 | Premus | ................... | G01S 3/802 |
| 9,986,503 B1* | 5/2018 | Amorim de Faria Cardote | .......... | H04W 52/0212 |
| 10,152,562 B1* | 12/2018 | Tanielian | ................ | G06F 17/40 |
| 10,309,779 B2* | 6/2019 | McArthur | ............... | G01N 1/10 |
| 10,587,348 B2* | 3/2020 | Goren | ...................... | H01Q 1/04 |
| 10,725,149 B1* | 7/2020 | Premus | ................... | G01S 7/539 |
| 10,887,087 B2* | 1/2021 | Viswanathan | ........ | H04L 67/568 |
| 2009/0245025 A1* | 10/2009 | Rhodes | .................... | H01Q 1/04 367/134 |
| 2011/0032794 A1* | 2/2011 | Rhodes | ................ | G01V 1/3808 367/134 |
| 2011/0071966 A1* | 3/2011 | Holley | .................. | E21B 47/001 706/46 |
| 2012/0051186 A1* | 3/2012 | Holley | .................. | E21B 33/035 367/131 |
| 2013/0187787 A1* | 7/2013 | Damus | ................... | H04B 13/02 340/850 |
| 2021/0197930 A1* | 7/2021 | Frazer | ..................... | B63B 22/14 |

\* cited by examiner

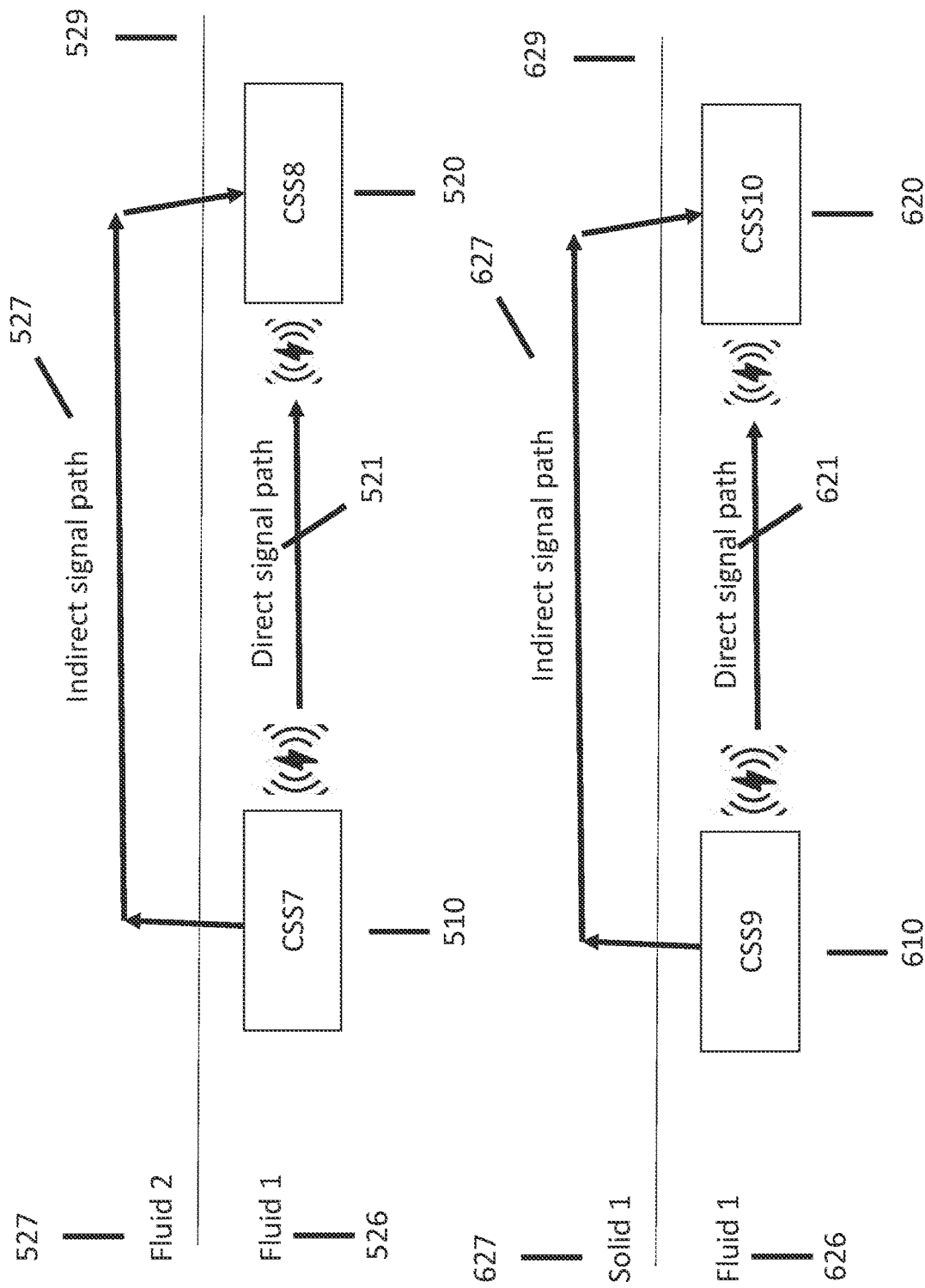

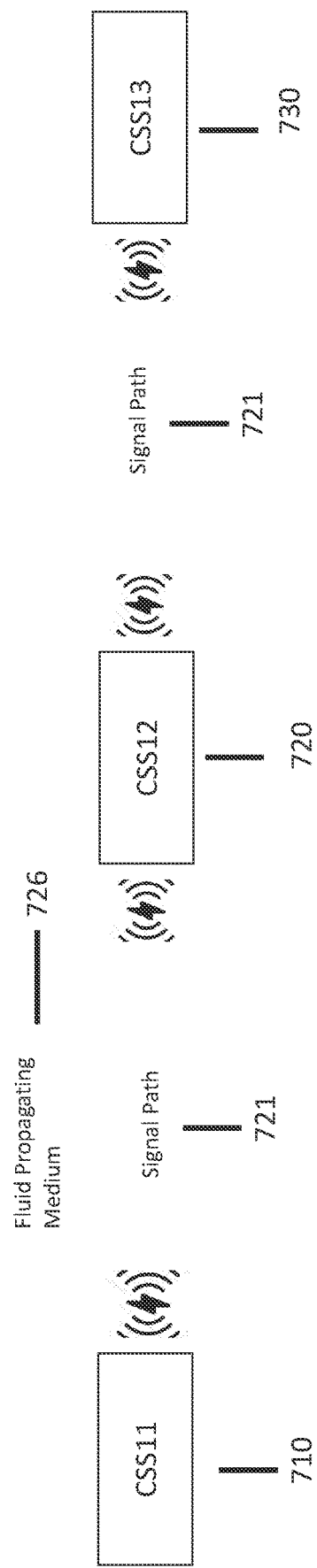

COMPACT SURVEILLANCE SYSTEM

TECHNICAL FIELD

The present disclosure relates to surveillance systems, and more particularly to compact surveillance systems which are designed for energy efficiency.

BACKGROUND

Surveillance is the monitoring of behaviour, activities, or information for the purpose of information gathering, influencing, managing or directing. This can include the use of sensors locate near to or at a distance from a life form, location, asset or equipment to be monitored. It can also include simple technical methods, such as human intelligence gathering and postal interception.

Surveillance systems are used in a wide number of applications including but limited to promote safety, security, health and wellbeing, to protect the environment, to enhance operational efficiency or to reduce costs. Typically, a surveillance system includes one or more sensors that are mounted in a location sought to be monitored. Data from sensors may be sent immediately by wired or wireless communications across a network to a monitoring system for real time monitoring by personnel and/or an automated or autonomous system. The sensor data may be processed at or near the sensors to derive information which is sent to a monitoring system which may be cloud based. Data that has been processed locally by algorithms may provide information used to improve the performance of other attributes of the surveillance system.

Surveillance systems suffer several drawbacks. One drawback is remote surveillance systems which are powered by a temporary source such as a battery and which use wireless communications suffer from the cost and operational complexity of battery replacement. The used working life of a battery-powered system is affected by the number of sensors used, sensor duty cycle, and the frequency of communications across a wireless network and the quantity of data transmitted and practical considerations of local recharging using solar or other means.

The energy efficiency of most systems is less than what might be desired, reducing the usefulness of such systems. Increasing the energy efficiency of surveillance systems, however, requires one or more of optimising sensor energy consumption, optimising sampling rate and optimising the quantity and frequency of information transfer. Such adjustments to sampling frequency and data transmission or information transfer may lead impact resolution and/or latency of the surveillance system.

BRIEF DESCRIPTION OF THE DRAWINGS

FIG. 5 illustrates another embodiment of a network of compact surveillance systems of the present invention.

FIG. 6 illustrates another embodiment of a network of compact surveillance systems of the present invention.

FIG. 7 illustrates another embodiment of the present invention.

SUMMARY

Figure 1:
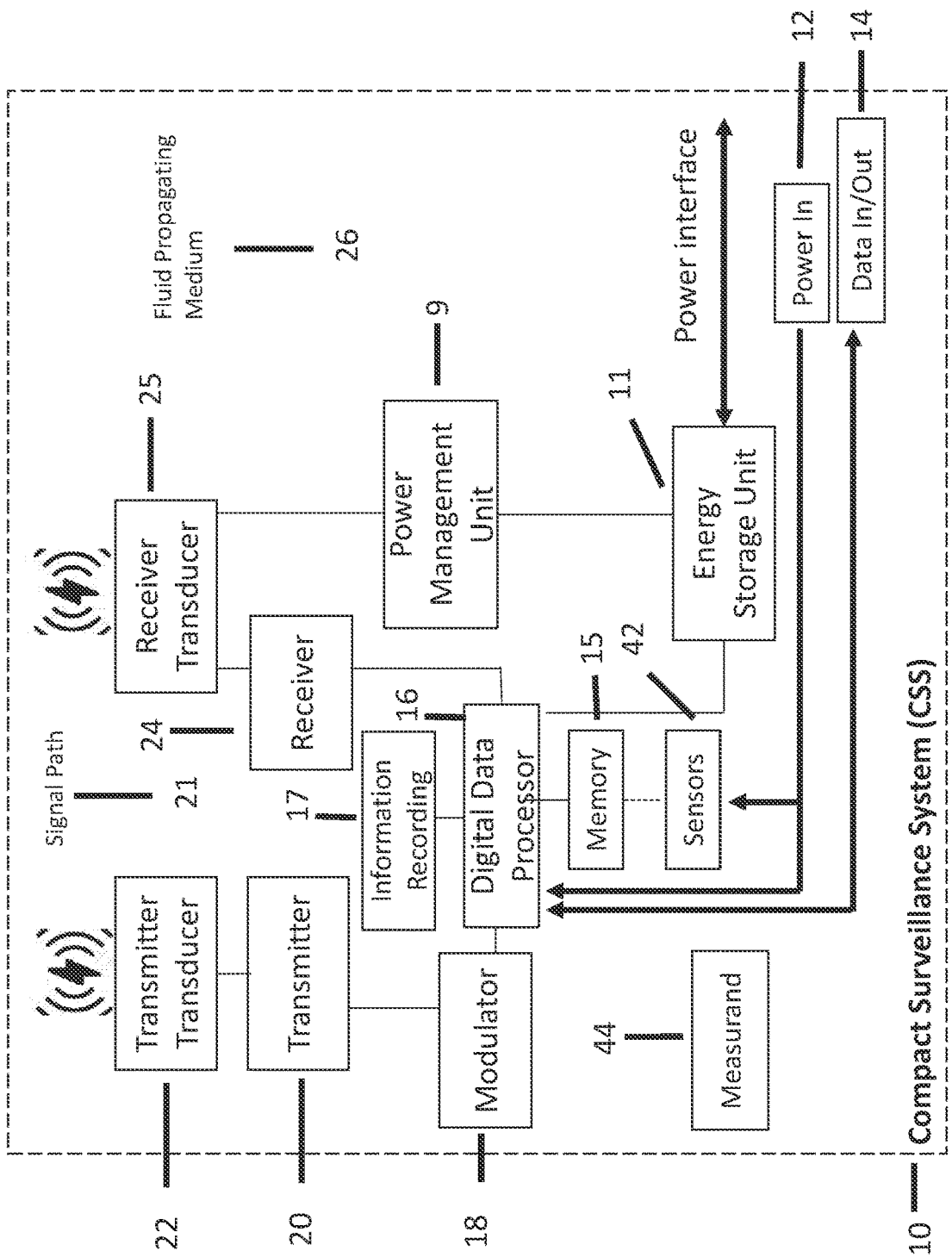
FIG. 1 illustrates one embodiment of a compact surveillance system of the present invention.

An object of the present invention is to provide a compact surveillance system with s smart transducer.

Another object of the present invention is to provide a compact surveillance system using inductive coupling, and more particularly to wireless power and communication systems including a loosely coupled transformer.

A further object of the present invention is to provide a compact surveillance system using radio and operating in the near-field.

Yet another object of the present invention is to provide a compact surveillance system integrated with a subsea electronics module.

An object of the present invention is to provide a compact surveillance system with temperature gradient sensors.

Another object of the present invention is to provide a compact surveillance system with integrated communications and sensing device.

Still a further object of the present invention is to provide a compact surveillance system compact surveillance system with integrated communications and sensing device for measuring the properties of EM or acoustic waves using more than one frequency.

Yet another object of the present invention is to provide a compact surveillance system for measuring location.

A further object of the present invention is to provide a surveillance system for surveillance of scour.

Still a further object of the present invention is to provide a compact surveillance system with far field communications for measurement of a measurand.

These and other objects of the present invention are achieved in a near field compact surveillance system that includes: a power source configured to provide power to the system; a power input coupled to the power source and configured to provide power to the system; one or more sensors configured to measure a measurand; a Loosely Coupled Transformer (LCT) transducer coupled to the one or more sensors and the power source, the LCT configured to receive an external signal and convert the external signal to an electrical signal; a processor in electrical or magnetic communication with the one or more sensors, the processor configured to process the electrical signal, generate information relative to one or more of progress against predictive behaviour of selected from one or more of: corrosion; fatigue; temperature; flow and environment; a modulator for modulating information onto a carrier signal, the modulator coupled to the processor; a radio for transmitting information to a remote receiver, the radio being coupled to the LCT; a remote receiver antenna coupled to the LCT; a power-saving transducer circuit coupled to the LCT; and at least one of the transmitter and the receiver being operable to communicate within near field, the near field of the electromagnetic and magnetic signals corresponding to a region around the LCT where the field strength corresponds to ear where a is a corrected for the medium save in a vacuum is the value of an integer.

DETAILED DESCRIPTION

For purposes of the present application, the following definitions apply:

Accumulator: For the purposes of the present invention, accumulator means an energy storage device 17 which accepts energy, stores energy and releases energy as needed. Examples of accumulator include battery, capacitor, inductor.

Acoustic: For purposes of the present invention, acoustic means transfer of one or more of acoustic signals and acoustic energy through a fluid.

AIoT: For purposes of the present invention, AIoT refers to Internet of Things (IoT) or Industrial Internet of Things (IIoT) devices with the ability to run advanced data processing or data reduction algorithms such as but not limited to Artificial Intelligence (AI), Machine Learning (ML), Digital Signal Processing (DSP)

Antenna: For the purposes of the present invention, antenna is a transducer used with a transmitter or receiver that is the interface between radio waves propagating through space and electric currents moving in metal conductors. It is a matching device that takes a wave on a transmission line and matches it into a medium. The antenna of the transmitter is a transducer component which converts electric energy to electromagnetic waves. The antenna of a receiver also operates as a transducer. In transmission, a radio transmitter supplies an electric current to the antenna's terminals, and the antenna radiates the energy from the current as electromagnetic waves (radio waves).

Artificial Intelligence: For the purposes of the present invention, Artificial intelligence (AI), also known as machine intelligence, is a branch of computer science that aims to imbue software with the ability to analyse its environment using either predetermined rules and search algorithms, or pattern recognizing machine learning models, and then make decisions based on those analyses.

Atmospheric Noise Suppression: For purposes of the present invention, Atmospheric Noise Suppression (ANS) means a technique applied to sink design which suppresses impulsive interference. ANS limits the source amplitude at a level close to thermal noise and in a bandwidth significantly larger than the signal bandwidth. By this means the energy of an interference impulse is rendered constant independent of its true energy. The signal can be recovered by matched filtering provided the signal duration sufficiently exceeds the duration of the interfering impulses.

Auxiliary Control System: For purposes of the present invention, auxiliary control system is a control system designed to operate remote equipment, typically subsea. Auxiliary control systems may be found on subsea process equipment including but not limited to risers, compressors, separators.

Cloud computing: For purposes of the present invention, cloud computing means the on-demand availability of computer system resources especially data storage and computing power without direct active management by the user.

Cognitive radio (CR): For purposes of the present invention, cognitive radio is a radio that can be programmed and configured dynamically to use the best wireless channels in its vicinity to avoid user interference and congestion. Such a radio automatically detects available channels in wireless spectrum available, then accordingly changes its transmission or reception parameters to allow more concurrent wireless communications in a given spectrum band at one location. This process is a form of dynamic spectrum management.

Cognitive radio sensor network (CRSN): For purposes of the present invention, cognitive radio sensor network is a distributed network of wireless cognitive radio sensor nodes, which sense an event signal and collaboratively communicate their readings dynamically over available spectrum bands in a multi-hop manner ultimately to satisfy the application-specific requirements.

Coil: For the purposes of the present invention, coil means a reactive device that generates a magnetic field close to it. Unlike an antenna, it is not a matching device. A coil may be screened from E-field interference from the likes of electric motors.

Communications network: For the purposes of the present invention, communications network means an organization of transmitting and receiving stations for the reliable exchange of intelligence.

Core concentrates: For purposes of the present invention, core concentrates mean magnetic flux spatially by virtue of its permeability which exceeds the permeability of free space.

Data: For the purposes of this invention, data is the result of measurement.

Data Cleansing: For the purposes of this invention, data cleansing or data cleaning is the process of detecting and correcting or removing corrupt or inaccurate records from a record set, table, or database and refers to identifying incomplete, incorrect, inaccurate or irrelevant parts of the data and then replacing, modifying, or deleting the dirty or coarse data.

Data compression: For the purposes of the present invention, data compression means the process of reducing the size of a data file by eliminating redundancies.

Data deduplication: For the purposes of the present invention, data deduplication reduces the size of large data sets by removing information that is duplicated and leaving a pointer to the original data. Data deduplication includes but is not limited to inline and post-processing techniques including but not limited to erasure coding.

Data logger: For the purposes of the present invention, data logger means an electronic device that records data over time.

Data Masking: For the purposes of the present invention, data masking, sometimes referred to as data obfuscation, is the process of hiding original data with modified content. Data masking may be used, for example, to remove personal or commercially sensitive information.

Data post-processing: For the purposes of the present invention, data post-processing is a data mining technique that involves transforming raw data into an understandable format. Data post-processing techniques include but are not limited to data cleaning, data integration, sensor data correction for drift. For example, sensor data may be pre-processed to take account of fouling or drift.

Data Pre-processing: For the purposes of this invention, data pre-processing prepares raw data for further processing. Data pre-processing steps include but are not limited to data cleansing or cleaning, data editing, data wrangling, data deduplication, data integration, data transformation, data reduction, data discretization, data sampling and data resampling. In Machine Learning (ML) processes, data pre-processing is critical to encode the dataset in a form that could be interpreted and parsed by the algorithm.

Data processing: For purposes of the present invention, data processing is the transformation of raw data into meaningful information. It includes but is not limited to Machine Learning (ML), Artificial Intelligence (AI).

Data Reduction: For the purposes of the present invention, data reduction tools reduce the quantity of data to be stored and/or moved. Data reduction includes but is not limited to data de-duplication, data masking, dimensionality reduction, numerosity reduction and data compression.

Data sampling: For the purposes of the present invention, data sampling is the selection of a subset of individuals from within a statistical population to estimate characteristics of the whole population.

Data resampling: For the purposes of the present invention, data resampling involves the selection of randomized cases with replacement from the original data sample in such a manner that each number of the sample drawn has a number of cases that are similar to the original data sample. Down-sampling or decimation and up sampling are all forms of resampling.

Data security: For the purposes of the present invention, data security means protecting data from destructive forces and from the unwanted actions of unauthorised users such as cyber-attacks and data breaches.

Dataset: For purposes of the present invention, a data set or dataset is a collection of data.

Data transmission: For the purposes of the present invention, data transmission is one form of data transfer in which a transmitter sends data by wireless means to a receiver using one or more of radio, acoustic or optical methods.

Data Transfer: For the purposes of the present invention, data transfer is the process of moving data across a wired or wireless network.

Dickie-Fix: For the purposes of the present invention, Dickie-Fix (DF) means a technique applied to receiver design which suppresses impulsive interference. DF limits the source amplitude at a level close to thermal noise and in a bandwidth significantly larger than the signal bandwidth. By this means the energy of an interference impulse is rendered constant independent of its true energy. The signal can be recovered by matched filtering provided the signal duration sufficiently exceeds the duration of the interfering impulses.

Digital Health: For purposes of the present invention, Digital Health means the field of knowledge and practice associated with the development and use of digital technologies to improve health, wellbeing and performance of people, animals, vehicles, robotics, equipment and assets. Many of the advances made in IoT, wearables, low power computing, low power sensors, big data and AI designed to benefit human Digital Health are directly transferrable or readily adapted to meet the needs of vehicles, equipment and assets.

Dimensionality reduction: For the purposes of the present invention, dimensionality reduction means the transformation of data from a high-dimensional space into a low-dimensional space so that the low-dimensional representation retains some meaningful properties of the original data, ideally close to its intrinsic dimension.

Dimensionality reductions techniques include but are not limited to missing values ration, low variance filtering, high correlation filtering, random forest/ensemble trees, principal component analysis (PCA), backward feature elimination and forward feature construction.

Distributed cloud: For purposes of the present invention, distributed cloud means cloud computing served across multiple locations and/or multiple systems.

Edge computing: For the purposes of the present invention, edge computing is where data is analysed and acted upon at the point of collection, or on a nearby system situated between the connected device and the cloud (a concept known as "fog computing")

Electromagnetism: For purposes of the present invention, electromagnetism is a type of physical interaction that occurs between electrically charged particles. The electromagnetic force is carried by electromagnetic fields composed of electric fields and magnetic fields, and it is responsible for electromagnetic radiation such as light.

Electromagnetism refers to phenomena that are caused by both electric forces as well as magnetic forces Electromagnetism is a fundamental concept in physics.

Electromotive Force (EMF): For purposes of the present invention, electromotive force (emf, denoted E and measured in volts), is the electrical action produced by a non-electrical source. Devices (known as transducers) provide an emf by converting other forms of energy into electrical energy, such as batteries (which convert chemical energy) or generators (which convert mechanical energy).

Energy (W): For purposes of the present invention, energy is the capacity to do some work. It is power which is integrated over time. The unit of energy is joules or watt-seconds. Energy is a time quantity or component and can be stored.

Expanding magnetic field: For purposes of the present invention, expanding magnetic field means diverting or diluting a magnetic field with passage from its source. The density of flux diminishes as $1/r^3$, where r is distance of the point of observation to the source.

Far field: For the purposes of the present invention, far field, also known as the radiation-zone field, is the region in which the field acts as "normal". Far fields fall off in amplitude by $1/r$.

Field strength: For purposes of the present invention, field strength means due to current and measured in amperes/meter and is the force in Newtons experienced by a unit pole.

Fluid: For purposes of the present invention, a fluid is a substance that continually deforms or flows under an applied shear stress or external force. Fluids are a phase of matter and include liquids, gases and plasmas. Water and air are both fluids and from time to time the seabed exhibits the properties of a fluid.

Flux Coupling: For purposes of the present invention, flux coupling means flux originating at a source which is intercepted by a sink.

Flux guide: For the purposes of the present invention, a flux guide is a permeable material, typically a piece of metal or a metal structure that couples with magnetic flux and acts as a conduit, transporting the flux over a greater distance that it would otherwise.

Heuristic: For the purposes of the present invention, heuristic means problem-solving methods executed through learning-based techniques and experience. Heuristic methods are designed 1 or conceptual simplicity and enhanced computational performance—often at the cost of accuracy.

Heuristic data management tools: For the purposes of the present invention, heuristic data management tools, algorithms, techniques and methods are non-linear methods of treating data to reduce unwanted data.

Hybrid: For the purposes of the present invention, invention hybrid means more than one transfer technology.

Hybrid cloud: for the purposes of the present invention, hybrid cloud means a system that uses public and private clouds Hybrid transducer: for the purposes of the present invention, hybrid transducer means a transducer used for more than one purpose, as non-limiting examples communications and sensing, communications and energy scavenging.

Hydrophone: For the purposes of the present invention, hydrophone is a microphone which detects sound waves under water.

Inductor: For the purposes of the present invention, inductor, also called a coil, choke, or reactor, is a passive two-terminal electrical transducer that stores energy in a magnetic field when electric current flows through it. An inductor typically consists of an insulated wire wound into a coil.

Induction rate of change of flux: For purposes of the present invention, induction rate of change of flux, creates electromotive force (EMF).

Inductive coupling: For purposes of the present invention, inductive coupling is the transfer of energy between two inductors or inductive devices by a linking electromagnetic field.

Information: For the purposes of the present invention, information is derived from data that have been processed, organised, structured or subject to interpretation by computer algorithm to make them meaningful or useful. Compressing data does not in itself result in information. Information provides context for data.

Information network: For the purposes of the present invention, information network or computer network, is a group of computers that use a set of common communications protocols over digital interconnections for the purposes of sharing resources located on or provide by the network nodes.

Information recording unit: for the purposes of the present invention, an information recording unit is an electronic storage system that records information derived from the pre-processing and/or processing of sensor data Information Transfer: For purposes of the present invention, information transfer means when the information is encoded as changes in current in a source coil, a sink coil, sufficiently close to the source to experience mutual coupling will experience an EMF proportional to the rate of change of current in the source. This effect may be used to transfer information from source to sink.

Numerosity: For the purposes of the present invention numerosity is a reduction technique wherein the original data is replaced by smaller forms of data representation. It is a form of data reduction.

Lattice: For purposes of the present invention, lattice means a symmetrical arrangement of components in a network (such as an attenuator, a filter, or a bridge circuit).

Lattice Network: For purposes of the present invention, lattice network means designated arrangement of sources and sinks used for any combination of power, data or information transfer.

Link: For the purposes of the present invention, link means the act or process of creating a signal path or data connection.

Loop antenna: For the purposes of the present invention, loop antenna means a loop or coil of wire that interacts directly with the magnetic field of a radio wave, rather than its electric field, making it relatively insensitive to electrical noise within about a quarter-wavelength of the antenna. The loop antenna is matched to the transmitter. A large loop antenna with a perimeter of a full wavelength of any whole number of wavelengths is naturally resonant. Small loop antennas in which the loop perimeter is less than half-wavelength, and sometimes called 'magnetic loops' have a small radiation resistance, typically smaller than the loss resistance, making small loops inefficient for transmission. However, they are very effective receiving antennas at low frequencies.

Loop: For purposes of the present invention, loop means a coil for low impedance coupling.

Loose coupling: For purposes of the present invention, loose coupling means that it transfers only small amounts of energy, as when a primary and secondary coil are spaced so far apart that the coefficient of coupling is small.

Loosely Coupled Transformer (LCT): For purposes of the present invention, loosely coupled transformer (LCT) means a transformer in which the primary and secondary coil are separated spatially and do not share the flux path in a common core of high permeability. The flux linkage will be weak and the mutual inductance much less than the self-inductances of the primary and secondary coils. An LCT can be configured to transfer power only or data and power.

Luminescence: For the purposes of the present invention, luminescence is emission of light by a substance not resulting from heat; or "cold light". It is thus a form of cold-body radiation. It can be caused by chemical reactions, electrical energy, subatomic motions or stress on a crystal.

Machine Learning (ML): For the purposes of the present invention, Machine Learning (ML) is computer algorithms that improve automatically through experience.

Magnetism: For the purposes of the present invention, magnetism is a class of physical phenomena that are mediated by magnetic fields. Electric currents and the magnetic moments of elementary particles give rise to a magnetic field, which acts on other currents and magnetic moments. Magnetism only refers to phenomena that are caused by magnetic forces. Magnetism is a fundamental concept in physics.

Magnetic flux density: For purposes of the present invention, magnetic flux density means a measure of the strength of a magnetic field. Flux is measured in Weber's and Flux Density in Tesla, being Weber's per square meter.

Magneto-Inductive (MI) Communications: For purposes of the present invention, magneto-inductive communications are a form of communication that uses the quasi-static AC magnetic field generated by a transmitting antenna operated with very low radiation impedance. MI systems operate in the ELF and VLF bands, typically between 30 Hz and 4 kHz.

Magneto-Inductive flow sensor: For purposes of the present invention, a magneto-inductive flow sensor uses the principle of electrodynamic induction for flow velocity measurement.

Measurand: For the purposes of this invention, measurand is the subject or object to be measured which may include but not be limited to the above water, below water and below ground environments; infrastructure including but not limited to electrical cables, pipes, flowlines, cages, protection systems, foundations, bridges, roads, fixed and floating structures; buildings including but not limited to industrial, civic, residential; above water, below water, below ground industrial processes; manned and unmanned vehicles; fauna and flora, including but not limited to humans, land, air and sea animals; environments including but not limited to underwater, underground, sea water, fresh water, above ground and above water.

Mesh network: For the purposes of the present invention, mesh network is a local topology in which the infrastructure nodes connect directly, dynamically and non-hierarchically to as many other nodes as possible and cooperate with one another to efficiently route data and information from/to clients.

Mutually coupled: For purposes of the present invention, mutually coupled means the power induced in a sink by the action of a source. To measure the power a load has to be applied at the sink and maximum power will be transferred when the load impedance is the conjugate of the sink impedance. Hence the coupled power is frequency sensitive.

Mutual Inductance: For purposes of the present invention, mutual inductance means the inductive effect of coupling between primary and secondary or source and sink. Mutual inductance modifies self-inductance.

Near Fields: For purposes of the present invention, near field means the amplitudes of the radiative near-field falls off as $1/r2$ and the reactive or induction near-field amplitudes fall off as $1/r3$. The reactive near field extends to approximately $\lambda/2\pi$ (approx. 0.159 wavelength). The radiative field extends to approximately 1 wavelength.

Node: For purposes of the present invention, a node is an interconnection point on a Lattice Network. It is an electronic device with data storage, one or more processors, one or more wireless transfer technologies. A node may incorporate one or more sensors.

Optical: For purposes of the present invention, optical means transfer of one or more of optical signals and energy through a fluid. Transducers such as photodetectors may be used to transform light passing through a fluid to energy.

Photodetector: For the purposes of the present invention, photodetector or photosensor, is a transducer that senses light or other electromagnetic radiation and converts light photons into current.

Power (P): For purposes of the present invention, power is the rate at which energy is transmitted. The unit of power is watts (W) or joules per second. It is an instantaneous quantity and cannot be stored.

Power-saving transducer circuit: For purposes of the present invention, power-saving circuit means a circuit integrated with a sink or receiver operable to perform coherent summations having a coherent summations time interval and a power control circuit coupled to said transducer circuit and operable to impress a power controlling duty cycle on the transducer circuit inside the summations time interval.

Primary Coil: For purposes of the present invention, primary coil, or primary winding, is the normal or usual input winding of a transformer. It is a reactive component reactive in the sense that it exhibits inductance. The inductance is caused by flux, itself caused by current in the coil being intercepted by the coil itself. Hence also called self-inductance as distinct from mutual inductance experienced when the flux created by one coil is intercepted by a second coil.

Processed data: For the purposes of the present invention, processed data is data that has been subject to algorithms to produce information. Data processing algorithms include but are not limited to data fusion, ML and AI.

Radio: For the purposes of the present invention, radio is the technology of signalling and communicating using radio waves. Radio waves are electromagnetic waves of frequency between 30 hertz (Hz) and 300 gigahertz (GHz). They are generated by an electronic device called a transmitter connected to an antenna which radiates the waves and received by a radio receiver connected to another antenna. As a non-limiting example, radio includes Bluetooth, BLE, Wi-Fi, 2G, 3G, 4G, LoRa.

Raw data: For purposes of the present invention, raw data is primary data collected from a source that has not been subject to data processing. They are usually not in the format required to perform analysis.

Rectenna: For purposes of the present invention, rectenna means a transducer for intercepting an electromagnetic field and converting the field energy intercepted into DC power. An optical rectenna is a rectenna that works with visible or infrared light.

Rekoil: For purposes of the present invention, rekoil means a rectifier-coil transducer, which converts induction field to energy for use by the sink thereby having the potential to improve energy efficiency of the node.

Resonant inductive coupling: For purposes of the present invention, resonant inductive coupling is a phenomenon with inductive coupling where the coupling becomes stronger when the "secondary" (load-bearing) side of the loosely coupled coil resonates.

Secondary Coil: For purposes of the present invention, secondary coil, or secondary winding, is the normal output winding of a transformer. It is a reactive component as the primary. The secondary can be regarded as a component of a sink while the primary is a source and the coupling between the two is due to primary flux being intercepted by the secondary. This flux shared between source and sink is the cause of mutual inductance which allow an EMF to be created in the sink when current changes in the source.

Secondary inductance: For purposes of the present invention, secondary inductance is the inductance of the secondary winding of a transformer whose primary winding is unloaded.

Sensor: For purposes of the present invention, sensor is a device, module, machine, or subsystem whose purpose is to detect events or changes in its environment and send the information to other electronics.

Sensor data: For purposes of the present invention, sensor data is the output of a device that detects and responds to some type of input from the physical environment.

Sensor fusion: For purposes of the present invention, sensor fusion is combining of sensory data or data derived from disparate sources such that the resulting information has less uncertainty than would be possible when these sources were used individually.

Signal: For purposes of the present invention, signal is any time varying voltage, current, electromagnetic wave, electric or magnetic field Sink: For purposes of the present invention, sink has one or more secondary coils, analogue electronics and a data output. It creates a voltage or EMF as a result of intercepting a changing field created by a changing current. A constant current cannot excite an EMF in a sink. The EMF is proportional to the number of turns on the sink coil and the rate of change of field or flux. In most cases this means the EMF is proportional to frequency.

Smart transducer system: For the purposes if the present invention, smart transducer system incorporates a minimum of one of intelligent antenna and impulsive interference suppression and software defined radio and adaptive radio.

Snap bracelet: For purposes of the present invention, snap bracelet is a device that consists of layered flexible bistable spring bands sealed within a plastic cover and used to attach an electronic device to a structure, object, person or animal.

Source: For purposes of the present invention, source has a data input, electronics and one or more primary coils. It creates a voltage or EMF as a result of intercepting a changing field created by a changing current. A constant current cannot excite an EMF in a sink. The EMF is proportional to the number of turns on the sink coil and the rate of change of field or flux. In most cases this means the EMF is proportional to frequency.

Source of a magnetic field: For purposes of the present invention, source of a magnetic field is current. Electric current, which is movement of charge, must create a magnetic field. Causing current to flow in a coil magnifies the current because the currents in individual turns have additive effect, so N-turns means the effective current is magnified N times.

Suction cup: For the purposes of this invention, suction cup, also known as a sucker, is a device or object that uses the negative fluid pressure of air or water to adhere to nonporous surfaces, creating a partial vacuum Temperature gradient: For purposes of the present invention, the temperature gradient is a physical quantity that describes in which direction and at what rate the temperature changes the most rapidly around a particular location. The temperature gradient is a dimensional quantity expressed in units of degrees (on a particular temperature scale) per unit length. The SI unit is kelvin per meter (K/m). As a non-limiting example, a thermometer is a device that measures temperature gradient.

Transfer: For purposes of the present invention, transfer means moving one or more of power and information and data across a gap using magnetic fields or electric fields or electromagnetic fields.

Transducer: For the purposes of the present invention, transducer is a device that converts one quantity into another quantity, specifically when one of the quantities is electrical. Thus, a loudspeaker converts electrical impulses into sound, a microphone converts sound into electrical impulses, a photocell converts light into electricity, a thermocouple converts heat into electricity, etc.

Transformer: For the purposes of the present invention, transformer is a device using electromagnetic induction to transfer electrical energy from one circuit to another (i.e., without direct connection between them). In its simplest form, a transformer consists of separate primary and secondary coils wound on a common core of ferromagnetic material, such as iron. When an alternating-current flows through the primary coil, the resulting magnetic flux in the core induces an alternating voltage across the secondary coil; the induced voltage can cause a current to flow in an external circuit.

Transition zone: For the purposes of the present invention, transition zone is the region between the near and far field regions. It is the region within which near-field behaviour dissipates leaving far-field effects as dominant. The transition zone lies between $1\lambda$ and $2\lambda$.

Transmitter: For the purposes of the present invention, transmitter is an electronic device dedicated to emitting electromagnetic signals.

Wireless mesh network: For purposes of the present invention, wireless mesh networks dynamically serve as a router for every other node so that in the event of a failure of some nodes the remaining nodes can continue to communicate with each other.

Wireless Transfer: For purposes of the present invention, wireless transfer technologies include but are not limited to LCT, radio, MI, CR, acoustic and optical.

As illustrated in FIG. 1, one embodiment of a compact surveillance system (CSS) 10 includes: a power input 12; a sensor 42; a data input 14; a data memory storage a processor 16, an information storage device 17; a modulator 18, a transmitter transducer 22; and a receiver transducer 25.

In one embodiment, the sensor 42 is configured to measure a measurand 44. In the present example, the sensor comprises two temperature gradient sensors 42 configured to provide a signal indicative of a temperature and/or temperature gradient.

In one embodiment, the processor 16 is in electrical communication with: the data input 14; the data memory storage 15; the modulator 18; the information storage device 17; and the receiver transducer 25. The processor 16 is configured to receive measurand data from the sensor. The processor 16 is also operable to pre-process and process the data into information. The processor 16 stores the information on the information storage device 17 and generates an information signal representative of the information. For example, the processor 16 is configured to derive one or more selected from the range of: a thermal gradient; a temperature time constant; and a thermal property of the measurand. The information signal is communicated to the modulator 18.

In one embodiment, the modulator 18 is in electrical communication with the processor 16 and the transmitter transducer 22. The modulator 18 is configured to receive the information signal generated by the processor 16. The modulator 18 is also configured to superimpose the information signal on to a carrier signal, and the modulated signal is subsequently communicated to the transmitter transducer 22.

In one embodiment, the transmitter transducer (LCT) 22 is in electrical communication with the modulator 18. The transmitter transducer 22 is configured to receive the modulated signal and convert the modulated signal into an electromagnetic wave for transferring to a remote device (not shown). In alternative embodiments, the transmitter transducer may convert the modulated signal into a magneto-inductive signal.

In one embodiment, the receiver transducer 25 is in electrical communication with the processor 16. The receiver transducer 25 comprises an intelligent antenna. The receiver transducer 25 is configured to receive an external signal from an external source (not shown).

As a non-limiting example, the CSS 10 is at least partially submerged in a fluid propagating medium 26 such that the receiver transducer 25 is submerged in the fluid propagating medium 26. A signal path between the transmitter transducer 22 and the receiver transducer 25 at least partially traverses the fluid propagating medium.

In one embodiment, the CSS 10 includes an energy harvesting module. In particular, the CSS 10 further comprises a power management unit 9 and an energy storage device 17. The receive transducer 25 comprises a rectenna, said rectenna being in electrical communication with the power management unit 9. The rectenna is configured to convert electromagnetic energy of the external signal into energy. The energy storage device 17 is a battery configured to store energy from the rectenna, and release said energy to the CSS 10. The power management unit 9 is a microcontroller configured to govern power functions. For example, the power management unit 9 measures a voltage and/or a discharge and recharge time of the energy storage device. The power management unit 9 controls power functions, and regulates a real time clock.

In one embodiment of the present invention, a compact surveillance system (CSS) includes: a power source 9 configured to provide power to the system 10; a power input 12 coupled to the power source 9 and configured to provide power to the system one or more sensors configured to measure a measurand; a Loosely Coupled Transformer (LCT) transducer (22, 25) coupled to the one or more sensors and the power source 9, the LCT (22, 25) configured to receive an external signal and convert the external signal to an electrical signal; a processor 16 in electrical or magnetic communication with the one or more sensors, the processor 16 configured to process the electrical signal, generate information relative to one or more of progress against predictive behaviour of selected from one or more of: corrosion; fatigue; temperature; flow and environment; with the wireless transfer system transferring information to a remote Loosely Coupled Transformer LCT transducer (22, 25) and converts sensor data input 14 to information using modelling; an information storage device 17 configured to store the information or data input 14, the information including processed data, pre-processed data and predictive models, with a resultant output of models is stored; and where the LCT (22, 25) transducer is configured to transfer the information, the information being generated based on a measurand to reduce a transfer energy in the system 10.

In various embodiments, the LCT (22, 25) can include one or more of: a supercapacitor; a source transducer including a resonant primary coil; a sink transducer including a resonant secondary coil and a rekoil sink; impulsive interference suppression; at least one of a source transducer and a sink transducer; and a rectenna configured to convert electromagnetic energy of the external signal into electrical energy.

As a non-limiting example, the LCT (22, 25) is a smart LCT (22, 25).

In one embodiment, the information is modulated as a modulated signal onto a carrier signal, the modulated signal being an electromagnetic wave.

In one embodiment, the information storage device 17 stores the measurement.

In one embodiment, an information input is configured to receive external information from an external source.

In one embodiment, the processor 16 generates the information based on environmental information and the external information.

In one embodiment, the one or more sensors each comprise a processor 16 having logic configured to determine a parameter of the measurand.

In one embodiment, at least one of a source transducer (22, 25) and a sink transducer is located in a fluid.

In one embodiment, the rectenna is configured to capture and convert ambient energy into electrical energy.

In one embodiment, the system 10 includes an energy storage unit configured to store the electrical energy captured by the rectenna.

In one embodiment, a CSS 10 is provided and includes: a power source 9 to provide power to the system 10; a power input 12 coupled to the power source 9; one or more sensors to measure a measurand; an LCT (22, 25) coupled to the one or more sensors and the power source 9, the LCT (22, 25) received an external signal and converts the external signal to an electrical signal; a processor 16 in electrical or magnetic communication with the one or more sensors, the processor 16 processing the electrical signal, generate information relative to one or more of progress against predictive behaviour of selected from one or more of: corrosion; fatigue; temperature; flow and environment; a modulator 18 for modulating information onto a carrier signal; an LCT sink incorporating impulsive interference suppression, and wherein power or information is transferred from source to the LCT (22, 25).

In one embodiment of the system 10, a field strength of the system 10 at a sink transducer due to $1/r2$ component is greater than field strength due to the $1/r$ component, and field strength at the sink transducer due to $1/r3$ component is greater than field strength due to $1/r$ component.

In one embodiment of the system 10, a minimum of one of radio and CR and MI and optical and acoustic is provided with the system 10.

In one embodiment of the system 10, field strength at a sink transducer due to $1/r$ component is greater than field strength due to $1/r2$ component, and field strength at the sink transducer due to $1/r$ component is greater than field strength due to $1/r3$ component.

In one embodiment of the system 10, the information is not compressed.

In one embodiment, the system 10 is adaptable to improve a minimum of one of energy efficiency and resilience and security and latency for a given range.

In one embodiment of the system 10, a minimum of a first system 10, that is one of mobile and portable and is integrated with a minimum of one of an underwater vehicles and a diver and a person and an animal and a surface vehicle and an aerial vehicle and a second system 10.

In one embodiment of the system 10, transducers are positioned to enable a part of the transfer to pass through one of a minimum of one fluid boundary and a minimum of one solid boundary In one embodiment of the system 10, transducers are placed such that a primary communication channel is indirect.

In one embodiment of the system 10, the processor 16 adapts a duty cycle to control a transfer using a minimum of two transfer methods.

In one embodiment, the system 10 is a secure passive monitoring system 10, where a minimum of two frequencies and a minimum of one a tone length is detectable using limiting comparator circuit for activation of the processor 16.

In embodiment of the system 10, a minimum of one of encryption, information masking information erasure, information resilience and information authentication are provided. These are not limited to a: digital ledger, blockchain, volatile 15, traps, a self-destruct fuse, an auto-destruct fuse, biodegradable materials, chemical release, and honeypot techniques. These provide for enhanced digital security.

In one embodiment of the system 10, an information network has at least three systems 10, and an information network incorporates a minimum of one of edge computing and a hybrid cloud.

In one embodiment, the network is configured such that information is transferred from a first to a second system, and the second system modifies this information through a minimum of one of removal of part of the information from the first system and addition information from the second system 10 to the information from the first system resulting in a processing of information from the first and second systems to derive new information and a transfer of this resultant to a third system.

In one embodiment, a minimum of one independent wireless device transfers one or more of information and information to the surveillance system. The field strength at the surveillance system, due to the 1/r component, is greater than the field strength due to the 1/r2 component. At a remote note, field strength due to the 1/r component is greater than the field due to the 1/r3 component.

In one embodiment, analytic models are used to provide information for use within a minimum of: a surveillance system, an automation system, and an autonomy system. These improve one or more of: environmental performance, a carbon footprint, safety, efficiency, reliability and compliance.

In one embodiment, each of a system 10 of the system 10 communicates with: a maximum of two other systems; one or more watchdog timers; a time syncronisation system; and a token verification system. This confirms a failure of the link. When there is a failure in the link, a new configuration is established with a further system based on one or more of: energy efficiency, reliability and security.

In one embodiment, a near field compact surveillance system 10 includes: a power source 9 configured to provide power to the system 10; a power input 12 coupled to the power source 9 and configured to provide power to the system 10; one or more sensors configured to measure a measurand; an LCT (22, 25) coupled to the one or more sensors and the power source 9, the LCT (22, 25) receiving an external signal and converting it to an electrical signal; a processor 16 in electrical or magnetic communication with the one or more sensors, the processor 16 processing the electrical signal, generates information relative to one or more of progress against predictive behaviour of selected from one or more of: corrosion; fatigue; temperature; flow and environment; a modulator 18 for modulating information onto a carrier signal, the modulator 18 coupled to the processor 16; a radio for transmitting information to a remote receiver, the radio being coupled to the LCT (22, 25); a remote receiver antenna coupled to the LCT (22, 25); a power-saving transducer circuit coupled to the LCT (22, 25); and at least one of the transmitter and the receiver being operable to communicate within near field, the near field of the electromagnetic and magnetic signals corresponding to a region around the LCT (22, 25) where the field strength corresponds to ear where a is a corrected for the medium save in a vacuum is the value of an integer.

In one embodiment, a subsea electronics module compact surveillance system 10 (SEM CSS) includes: a power source 9 configured to provide power to the system 10; a power input 12 coupled to the power source 9 and configured to provide power to the system 10; one or more sensors configured to measure a measurand; an LCT (22, 25) coupled to the one or more sensors and the power source 9, the LCT (22, 25) configured to receive an external signal and convert the external signal to an electrical signal; and a processor 16 in electrical or magnetic communication with the one or more sensors, the processor 16 configured to process the electrical signal, generate information relative to one or more of progress against predictive behaviour of selected from one or more of: corrosion; fatigue; temperature; flow and environment; a subsea electronics module coupled to the LCT (22, 25); at least one of an SEM available port and a wireless link; a hybrid CSS 10 with at least one of transmitters, two or more of: radio, MI, CR, acoustic, LCT (22, 25) and MI; and a smart LCT (22, 25) including at least one of: an intelligent antenna, impulsive interference suppression and software defined by radio and adaptive radio; at least one of: a continuous and duty cycle control of a communications link.

In one embodiment the system 10 includes: a minimum of one of LCT (22, 25), radio, cognitive radio, magneto-inductive, optical, acoustic and dielectric resonant communications.

In one embodiment of the system 10, the information is not compressed.

In one embodiment of the system 10, adaptable is provided to improve one or more of: a minimum of one of energy efficiency, resilience, security, and latency for a given range.

In one embodiment of the system 10, one or more of system 10: is mobile and portable and integrated with one or more of: an underwater vehicle, a diver, a person, an animal a surface vehicle and an aerial vehicle.

In one embodiment of the system 10, the LCT's (22, 25) are positioned to enable a part of a transfer to pass through one of a fluid boundary or solid boundary.

In one embodiment of the system 10, the LCT's (22, 25) are placed such that a primary communications channel is indirect.

In one embodiment of the system 10, a duty cycle is provided where: the processor 16 provides a minimum of one of sets and adapts a duty cycle to control a transfer using a minimum of two transfer methods.

In one embodiment of the system 10, a secure passive monitoring system 10 is included with a minimum of two frequencies and a minimum of one tone length detectable using limiting comparator circuit for activation of the processor 16.

In one embodiment of the system 10, the system 10 includes: a minimum of one of encryption, information masking, information erasure, information resilience and information authentication that includes but is not limited to: digital ledger, blockchain volatile 15, traps, self-destruct fuse, auto-destruct fuse, biodegradable materials, chemical release and hone) pot techniques to provide for enhanced digital security.

In one embodiment of the system 10, an information network is included with a minimum of three systems, wherein the information network incorporates a minimum of one of edge computing and hybrid cloud.

In one embodiment of the system 10, the information network is configured such that information is transferred from a first to a second system, and the second system modifies this information through a minimum of one of removal of part of the information from the first system and addition of information from the second system to the information from the first system and processes information from the first and second systems to derive new information and transfers the resultant to a third system.

In one embodiment of the system 10, the system 10 includes a minimum of: one independent wireless device configured to transfer one or more of information and information to a surveillance system, wherein the field strength at the surveillance system due to the 1/r component is greater than the field due to the 1/r2 component, and the field strength at the remote system due to the 1/r component is greater than the field due to the 1/r3 component.

In one embodiment of the system 10, analytic models are used to provide information for use within a minimum of one of: surveillance, automation, and autonomy systems to improve one or more of: environmental performance, carbon footprint, safety, efficiency, reliability and compliance.

In one embodiment of the system 10, the system 10 includes a second system, wherein each system 10 is configured to communicate with a maximum of two other systems and one or more of a: watchdog timer, time syncronisation system; token verification system that are used to confirm a failure of a link in which circumstances a new configuration is established based with selection based on one or more of: energy efficiency, reliability and security.

In one embodiment of the system 10, the system 10 includes a second system, and a network architecture is asymmetric and based on one or more of: primary/secondary, source/replica or provider/consumer.

In one embodiment, a temperature gradient compact surveillance system (TG CSS) 10 includes: a power source 9 configured to provide power to the system 10; a power input 12 coupled to the power source 9 and configured to provide power to the system 10; two or more temperature gradient (TG) sensors with a thermal conductivity along a length of each TG sensor is a minimum of one or more of a: fixed stepped, s variable and adaptable; a modulator 18 for modulating information onto a carrier signal; an LCT (22, 25) coupled to the one or more sensors and the power source 9, the LCT (22, 25) receiving an external signal and converts the external signal to an electrical signal; a processor 16 in electrical or magnetic communication with the one or more sensors, the processor 16 processing the electrical signal, generates information relative to one or more of progress against predictive behaviour of selected from one or more of: corrosion; fatigue; temperature; flow and environment; and a wireless transfer system with: radio, CR, acoustic and optical.

In one embodiment, a TG CSS system 10 includes: a power source 9 configured to provide power to the system 10; a power input 12 coupled to the power source 9 and configured to provide power to the system 10; two or more temperature gradient (TG) sensors with a thermal conductivity along a length of each TG sensor is a minimum of one of a fixed, S stepped, S variable and adaptable; a modulator 18 for modulating information onto a carrier signal; an LCT (22, 25) coupled to the one or more sensors and the power source 9, the LCT (22, 25) configured to receive an external signal and convert the external signal to an electrical signal; a processor 16 in electrical or magnetic communication with the one or more sensors, the processor 16 configured to process the electrical signal, generate information relative to one or more of progress against predictive behaviour of selected from one or more of: corrosion; fatigue; temperature; flow and environment; and a wireless transfer system with: radio, CR, acoustic and optical.

In one embodiment, a compact surveillance system 10 includes: a power source 9 configured to provide power to the system 10; a power input 12 coupled to the power source 9 and configured to provide power to the system 10; one or more sensors configured to measure a measurand; an LCT (22, 25) coupled to the one or more sensors and the power source 9, the LCT (22, 25) configured to receive an external signal and convert the external signal to an electrical signal; a processor 16 in electrical or magnetic communication with the one or more sensors, the processor 16 configured to process the electrical signal, generate information relative to one or more of progress against predictive behaviour of selected from one or more of: corrosion; fatigue; temperature; flow and environment; a modulator 18 for modulating information onto a carrier signal; a wireless transfer system with one of radio, MI CR and acoustic and optical; one of: an LCT (22, 25), oscillator, modulator 18 and DSP, is used by a communications system and the one or more sensors.

In one embodiment, a compact surveillance system 10 includes: one or more of: an LCT (22, 25), MI, radio, CR, optical and acoustic for communications and sensing; a power source 9 configured to provide power to the system 10; a power input 12 coupled to the power source 9 and configured to provide power to the system 10; one or more sensors configured to measure a measurand; an LCT (22, 25) coupled to the one or more sensors and the power source 9, the LCT (22, 25) configured to receive an external signal and convert the external signal to an electrical signal; an information memory storage 15; a digital information processor 16; a modulator 18 for modulating information onto a carrier signal; a wireless transfer system with one or more of: radio, MI, CR, acoustic and optical, configured to derive one of or more of location, relative location, alignment, movement and object detection; wherein at least one of an end of the system 10 is in a fluid.

In one embodiment, a (CSS) 10 includes: a plurality of hybrid compact surveillance systems (CSSs) 10, each hybrid CSS 10 including: a power source 9 configured to provide power to the system 10; a power input 12 coupled to the power source 9 and configured to provide power to the system 10; one or more sensors configured to measure a measurand; an LCT (22, 25) coupled to the one or more sensors and the power source 9, the LCT (22, 25) configured to receive an external signal and convert the external signal to an electrical signal; a processor 16 in electrical or magnetic communication with the one or more sensors, the processor 16 configured to process the electrical signal, generate information relative to one or more of progress against predictive behaviour of selected from one or more of: corrosion; fatigue; temperature; flow and environment; a modulator 18 for modulating information onto a carrier signal; a transfer system with one or more of radio, MI, CR, acoustic, optical and LCT (22, 25); a control device for a communications channel using one or more of: duty cycle and adaptable duty cycle; wherein a radio field strength at remote transducer due to the 1/r component is greater than field strength due to the 1/r2 component and field strength at remote transducer due to 1/r component is greater than field strength due to 1/r3 component, at least two hybrid CSSs 10 are coupled to a subsea structure above a seabed; at least one hybrid CSS 10 is coupled to a subsea structure below the seabed; each of a communication transducer of each hybrid CSS 10 being coupled to the subsea and each of a subsurface structure is located in an opening in the structure wall, a field strength of each of an inter-node link is measured and compared at a minimum of one frequency with derived information being processed to calculate the location of the seabed; and information describing one of an extent, rate, and variability of a seabed scouring is transferred to a monitoring system.

In one embodiment, a compact surveillance system 10 includes: a power source 9 configured to provide power to the system 10; a power input 12 coupled to the power source 9 and configured to provide power to the system 10; one or more sensors configured to measure a measurand; an LCT (22, 25) coupled to the one or more sensors and the power source 9, the LCT (22, 25) configured to receive an external signal and convert the external signal to an electrical signal; a processor 16 in electrical or magnetic communication with the one or more sensors, the processor 16 configured to process the electrical signal, generate information relative to one or more of progress against predictive behaviour of selected from one or more of: corrosion; fatigue; temperature; flow and environment; a modulator 18 for modulating information onto a carrier signal; a wireless transfer system with at least one of: radio, CR, acoustic, optical and LCT (22, A control device with a communications channel using a minimum of one of duty cycle and adaptable duty cycle; a field strength at a remote transducer due to the 1/r component is greater than field strength due to the 1/r2 component and field strength at remote transducer due to 1/r component is greater than field strength due to 1/r3 component; and wherein at least one LCT (22, 25) is in a fluid.

In one embodiment, a compact surveillance system (CSS) is provided and includes: a power input configured to provide power to the system; one or more sensors configured to measure data from a measurand; a transducer unit configured to receive or link with an external signal; and a processor configured to generate information, the processor being in electrical communication with: the one or more sensors; an information storage device configured to store the information; a transducer unit configured to transfer the information; wherein the information is generated based on the measurand so as to reduce a transfer energy.

As non-limiting examples, the measurand may include but is not limited to: above water, below water, below ground environments; infrastructure including but not limited to electrical cables, pipes, flowlines, cages, protection systems, foundations, bridges, roads, fixed and floating structures; buildings including but not limited to industrial, civic, and residential; below ground industrial processes; manned and unmanned vehicles; fauna and flora, including but not limited to humans, land, air and sea animals; environments including but not limited to underwater, underground, sea water, fresh water, above ground and above water.

In one embodiment, information is derived from data that has been processed, organised, structured or subject to interpretation by a computer algorithm to make the data meaningful or useful. Compressing data does not in itself result in information. Information provides context for data.

In one embodiment, the system is used for surveillance in environments which present information transfer challenges and with sensing apparatus which are required to function for a long time between maintenance events, or without any maintenance. This is typically the case for underwater surveillance, for example to monitor seismic activity. In this case, sensing apparatus must function reliably for an extended period of time, typically a number of years, without maintenance or the ability to replace or to recharge batteries through a mains-powered connection.

In one embodiment, it is vital for such a system to be energy efficient. Related to this, when measurement data or information derived therefrom is to be transferred through lossy mediums, for example through water, conventional apparatus may consume large amounts of power, requiring the use of large batteries if wired power connections are to be avoided. Thus, the present invention advantageously provides a reliable CSS which can operate and transfer measurement data or information derived therefrom with a high level of energy efficiency, thereby reducing wasteful energy consumption and a requirement to use large batteries.

As non-limiting examples, the system may be fixed or mobile. The system may be wired or wireless. The system may comprise a low power receive or sink circuit having a limiting comparator with high gain configured to ensure each active power level has the same sensitivity. In one embodiment, the system comprises a secure passive monitoring system, wherein a minimum of two frequencies and a minimum of one tone length is detectable using a limiting comparator circuit for activation of the processor. In one embodiment, the system comprises a minimum of two frequency settings, each having a tone, wherein the tones are configured to be detected at each of the required frequencies using a limiting comparator circuit for activation of the processor. In one embodiment, a probability of false wake-up due to one or more of electromagnetic interference (EMI) and/or magnetic interference and unauthorised access reduces with the number of frequency settings. In one embodiment, the processor is configured to set and adapt a duty cycle to control the transfer of information using a minimum of two transfer methods. For example, the duty cycle may be adapted based on criteria other than signal quality, range or bandwidth.

In one embodiment, the system operates according to an adjustable energy setting. The energy setting provides a sensor duty cycle, a sensor energy, a pre-processing algorithm, a processing algorithm, a frequency, a transducer energy, a transducer gain, and a transducer bandwidth.

In one embodiment, the one or more sensors are one or more selected from the range of: a temperature sensor; a multi-frequency sensor; a location sensor; an Eddy Current corrosion sensor; a cathodic protection sensor; an ultrasonic thickness sensor; a pH sensor, a water density sensor; a turbidity sensor; a bio-fouling build-up sensor; a water conductivity sensor; a water salinity sensor; a water density sensor; a water current sensor; a strain sensor; a chemical composition sensor; an electromagnetic field sensor; a magnetic field sensor; a gravitational field sensor; a flow sensor; a flow velocity sensor; a speed-of-sound sensor; a speed-of-EM propagation sensor; a speed-of-magnetic field propagation sensor; a light sensor; a pressure sensor; and an image sensor.

Accordingly, the processor is preferably operable to generate information such as: a speed-of-sound; a speed-of-EM field propagation; a speed-of-magnetic field propagation; a pH; a density; a conductivity; a salinity; a chemical composition; a velocity; a current; a biofouling; a turbidity; a location; an alignment; and a corrosion.

In one embodiment, the sensor is a low power sensor operable to measure the measurand at a lower sensitivity than a standard sensor. Advantageously, less power may be used. In one embodiment, the sensor may be a remote sensor configured to transfer measured data to the system, wherein the field strength at the surveillance system due to the 1/r component is greater than the field due to the 1/r2 component and the field strength at the remote node due to the 1/r component is greater than the field due to the 1/r3 component.

In one embodiment, the processor generates the information based on the measurand using one or more selected from the range of: a data model; a digital twin; a machine learning algorithm; and an artificial intelligence algorithm. In one embodiment, the information is generated in order to maximise energy efficiency at the expense of latency. In one embodiment, the information is compressed by the processor. In alternative embodiments, the information is not compressed by the processor. In one embodiment, the processor is operable to execute a pre-processing algorithm configured to improve one or more of: energy efficiency; resilience; security; and latency for a given range. For example, the pre-processing algorithm may include one or more selected from the range of: data cleansing or cleaning; data editing; data wrangling; data de-duplication; data integration; data transformation; data reduction; data discretization; data sampling; and data resampling. The information may comprise one or more selected from the range of: an image feature; a characteristic of the measurand; a development; a status; a health; a threshold; an alarm; a location; a movement; and a derived change of the measurand.

In one embodiment, the receiver unit comprises: a receiver transducer configured to convert the external signal into an electrical signal; a rectenna configured to convert electromagnetic energy of the external signal into electrical energy. In one embodiment, the rectenna is further configured to capture and convert ambient energy into electrical energy. The ambient energy may be one or more of an electromagnetic field, a magnetic field, an acoustic wave, and a temperature differential.

In one embodiment, the device further comprises an energy storage unit configured to store the electrical energy generated by the rectenna. The energy storage unit may comprise two or more accumulators for hybrid energy storage. For example, the accumulators may be one or more selected from the range of: a primary cell, a secondary cell, a capacitor, a supercapacitor, and an inductor. A size of the energy storage unit may be reduced due to the rectenna. This reduction in energy storage unit size leading to an improved compactness and a reduction in materials used for construction which brings benefits in the form of one or more of reduced environmental footprint, cost, and reliability.

In one embodiment, the receiver transducer is a smart transducer. Alternatively, or additionally, the receiver transducer comprises one or more selected from the range of: impulsive interference suppression; software defined radio; adaptive radio; cognitive radio; and a cognitive radio sensor network. In this way, a communications link energy efficiency and performance, resilience, and compactness of the system may improve. Additionally, or alternatively, the receiver transducer may comprise one or more selected from the range of: an antenna; an intelligent antenna; a loop antenna; a photodetector; a photoresistor; a phototransistor; and a photomultiplier.

In one embodiment, the device further comprises a data storage device configured to store the measurand.

In one embodiment, the transmitter unit comprises: a transmitter having a modulator configured to modulate the information on to a carrier signal; and a transmitter transducer configured to produce and radiate an electromagnetic wave comprising the modulated signal. In one embodiment, the transmitter transducer is a smart transducer. The smart transducer may comprise: a shield configured to reduce interference due to an electromagnetic field. Additionally, or alternatively, the smart transducer may comprise: a transmit loop antenna with a minimum of one of a maxima of 2 turns, and manufactured of low resistance and electrically insulated tube, and resonated, and maintained in resonance by varying a minimum of one of power and frequency and capacitance and signal processing.

Additionally, or alternatively, the transmitter may have one or more selected from: a loosely coupled transformer, an acoustic transmitter, an optical transmitter, a radio transmitter, a cognitive radio transmitter; and a magneto-inductive transmitter. Additionally, or alternatively, the transmitter may comprise one or more selected from the range of: an antenna; an intelligent antenna; a loop antenna; a photodetector; a photoresistor; a phototransistor; and a photomultiplier.

In one embodiment, the transmitter may include an antenna. Alternatively, the transmitter is a coil transducer.

In one embodiment, the system further comprises a data input configured to receive external data from an external source. Accordingly, the system may be attached to a communications cable configured to provide data to the system.

In one embodiment, the processor generates the information based on the measured data and the external data.

In one embodiment, the one or more sensors each comprise a processor having logic configured to determine a parameter of the measurand.

In one embodiment, the system comprises a supercapacitor. The supercapacitor may advantageously improve link performance.

In one embodiment, the processor is operable to perform one or more selected from the range of: encryption; data masking; data erasure; data resilience; data authentication not limited to digital ledger and blockchain and volatile memory and traps and self-destruct fuse and auto-destruct fuse and biodegradable materials and chemical release and honeypot techniques.

In one embodiment, the system comprises a Loosely Coupled Transformer (LCT) including a supercapacitor, a source transducer including a resonant primary coil, a sink transducer including a resonant secondary coil and a rekoil, sink incorporating impulsive interference suppression, at least one of a source transducer and sink transducer is located in a fluid propagating medium, wherein a minimum of one of power and information is transferred from source to a remote sink. The skilled person will understand that the term "rekoil" means a rectifier-coil transducer, which converts induction field to energy for use by the sink. This may improve energy efficiency of the system.

In accordance with a second aspect of the present invention, there is provided a network comprising: a first CSS having a first receiver and a first transmitter, the first transmitter configured to transfer an electromagnetic signal comprising information; and a second CSS having a second receiver and a second transmitter, the second transmitter configured to receive the electromagnetic signal, wherein at least one CSS is at least partially submerged in a fluid propagating medium; wherein the first transmitter and the second receiver are operable to communicate within a far field of said electromagnetic signal, said far field corresponding to the region around the transmitter; and wherein a field strength of the electromagnetic signal at an inverse distance (1/r) is greater than the field strength at an inverse distance squared (1/r2) and an inverse distance cubed (1/r3).

In one embodiment, the first transmitter and the second receiver are operable to communicate within near field, said near field of said electromagnetic signal corresponding to a region around the first transmitter where the field strength corresponds to ear where a is a correction term.

In one embodiment, the network is asymmetric. For example, the network may comprise a primary/secondary system, a source/replica system, or a provider/consumer system.

In one embodiment, the network further includes a third CSS.

In one embodiment, the network is configured as an edge computing network. In alternative embodiments, the network is configured as a hybrid cloud network.

In one embodiment, the network is configured as an information network such that information is transferred from the first system to the second system, and the second system modifies the information. The information may be modified by removal of a part of the information and/or addition of information from the second system. The modified information may be transferred from the second system to the third system.

In one embodiment, the network is a cabled network, configured to transfer information preferably over a low bandwidth information network and preferably using one or more of LCT and radio and Magneto-Inductive (MI).

In one embodiment, each system is configured to communicate with a maximum of two other systems. In one embodiment, one or more of a watchdog timers; a time synchronisation system; and/or a token verification system are used to confirm a failure of the link. In one embodiment, where a failure has been confirmed, a new configuration is established with a further system based on one or more of: an energy efficiency; a reliability; and a security.

In one embodiment, the first and second systems are attached to a subsea structure above a seabed, and a third system is attached to the subsea structure below the seabed. The attachment may be via an attachment mechanism such as: a magnetic clamp, a suction cup, a strap, a snap bracelet, a Velcro, a hinged clamp, a glue, a weld, and a fastener. In one embodiment, a field strength of each inter-system link is measured by the respective sensor, the field strength is compared at one or more frequencies, data is derived and processed to calculate the location of the seabed, and the information describing a minimum of one of the extent and rate of and variability of seabed scouring is transferred to a monitoring system.

Figure 2:
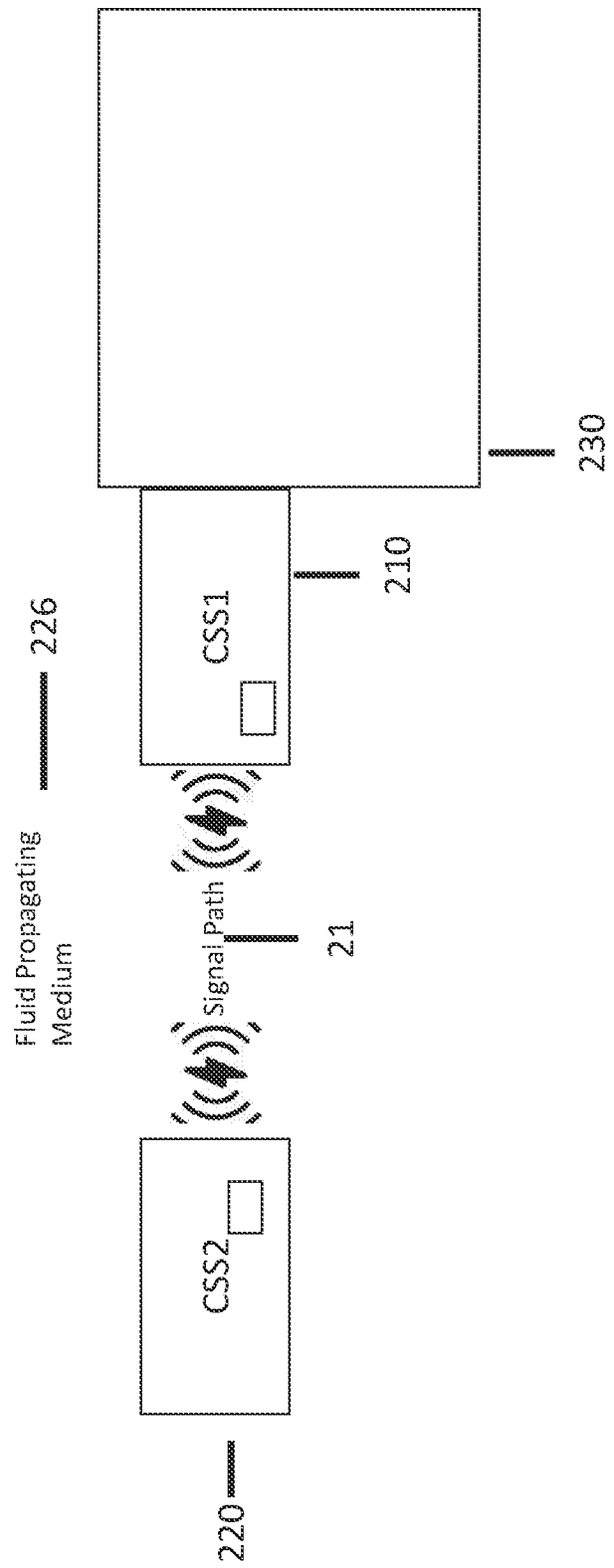
FIG. 2 illustrates one embodiment of a network of compact surveillance systems of FIG. 1, of the present invention.

FIG. 2 illustrates one embodiment of a network of compact surveillance systems with a first CSS 210 and a second CSS 220. The first CSS 210 and the second CSS 220 are substantially similar to the CSS 110. The first CSS 210 is integrated with an underwater vehicle 230, submerged in a fluid propagating medium 226, such as water.

Figures 3, 4:
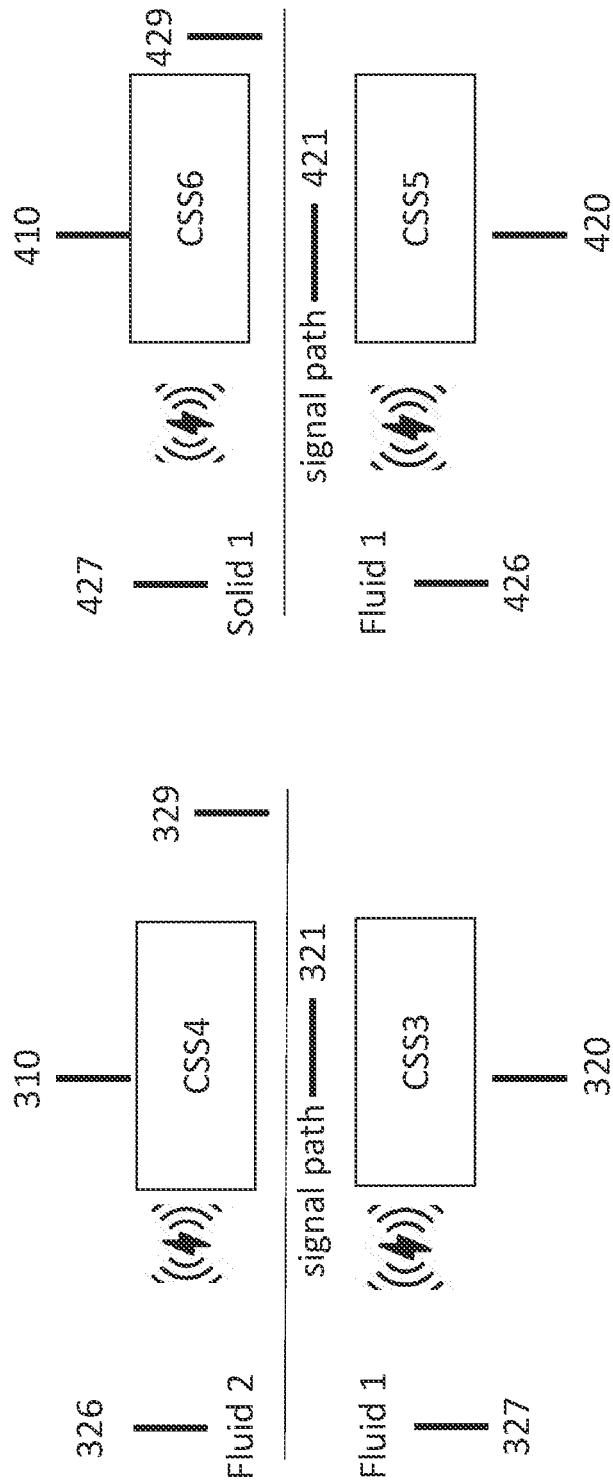
FIG. 3 illustrates one embodiment of network of compact surveillance systems of the present invention.
FIG. 4 illustrates another embodiment of network of compact surveillance systems of the present invention.

FIG. 3 illustrates one embodiment of a watchdog timer network of compact surveillance systems comprising a first CSS 310 and a second CSS 320. The first CSS 310 and the second CSS 320 are substantially similar to the CSS 10. The first CSS 310 is submerged in a first fluid propagating medium 326, such as water. The second CSS 320 is submerged in a second fluid propagating medium 327. The first fluid propagating medium 326 and the second fluid propagating medium 327 are separated by a fluid boundary 329. The respective transducers of the first CSS 310 and the second CSS 320 are configured such that an electromagnetic signal 321 transmitted by a transmitter transducer of the first CSS 310 traverses the boundary 329 and is received by the receiver transducer of the second CSS 320. Additionally, the first CSS 310 and the second CSS 320 are positioned such that a field strength of the electromagnetic signal received at the receiver transducer of the second CSS 320 at an inverse distance (1/r) is greater than the field strength at an inverse distance squared (1/r2) and an inverse distance cubed (1/r3).

FIG. 4 illustrates one embodiment of a network of compact surveillance system comprising a first CSS 410 and a second CSS 420. The first CSS 410 and the second CSS 420 are substantially similar to the CSS 10. The first CSS 410 is submerged in a first fluid propagating medium 426, such as water. The second CSS 420 is located in or on a solid propagating medium 427. The first fluid propagating medium 426 and the solid propagating medium 427 are separated by a solid boundary 429. The respective transducers of the first CSS 410 and the second CSS 420 are configured such that an electromagnetic signal 421 traverses the solid boundary 429. Additionally, the first CSS 410 and the second CSS 420 are positioned such that a field strength of the electromagnetic signal received at the receiver transducer of the second CSS 420 at an inverse distance (1/r) is greater than the field strength at an inverse distance squared (1/r2) and an inverse distance cubed (1/r3).

FIG. 5 illustrates one embodiment of a network of compact surveillance systems comprising a first CSS 510 and a second CSS 520. The first CSS 510 and the second CSS 520 are substantially similar to the CSS 10. The first CSS 510 and the second CSS 520 are both submerged in a first fluid propagating medium 526, such as water. A fluid-fluid boundary 529 separates the first fluid propagating medium 526 from a second fluid propagating medium 527. The respective transducers of the first CSS 510 and the second CSS 520 are configured such that an electromagnetic signal 521 transmitted by a transmitter transducer of the first CSS 510 is transmitted directly or indirectly. In the direct transmission case, the signal 521 traverses the first medium 526. In the indirect transmission case, the signal 521 traverses the fluid boundary 529, propagates through the second medium 529, and traverses the fluid boundary 529 from the second medium 529 to the first medium 526.

FIG. 6 illustrates one embodiment of a network of compact surveillance systems comprising a first CSS 610 and a second CSS 620. The first CSS 610 and the second CSS 620 are substantially similar to the CSS 10. The first CSS 610 and the second CSS 620 are both submerged in a fluid propagating medium 626, such as water. A fluid-solid boundary 629 separates the fluid propagating medium 626 from a solid propagating medium 627. The respective transducers of the first CSS 610 and the second CSS 620 are configured such that an electromagnetic signal 621, 627 transmitted by a transmitter transducer of the first CSS 610 is transmitted directly or indirectly. In the direct transmission case, the direct signal 521 traverses the first medium 626. In the indirect transmission case, the indirect signal 627 traverses the fluid boundary 629, propagates through the second medium 629, and traverses the fluid boundary 629 from the second medium 629 to the first medium 626. Additionally, the first CSS 610 and the second CSS 620 are positioned such that a field strength of the electromagnetic signal received at the receiver transducer of the second CSS 620 at an inverse distance (1/r) is greater than the field strength at an inverse distance squared (1/r2) and an inverse distance cubed (1/r3). The indirect transmission path 621 is longer than the direct transmission path 627. Transferring through the boundary 629 is sub-optimal.

FIG. 7 illustrates one embodiment of a network of compact surveillance systems comprising a first CSS 710, a second CSS 720, and a third CSS 720 submerged in a fluid propagating medium 726. The first CSS 710, the second CSS 720, and the third CSS 730 are substantially similar to the CSS 10. The first CSS 710 transfers a first information to the second CSS 720. The second CSS 720 modifies, via its processor, the first information so as to include additional information. The second CSS 720 transfers a second information, comprising the first information and the additional information, to the third CSS 730.

Ina compact surveillance system (CSS) 10. System 10 includes: power input 12; sensor 42; data input 14; data memory storage 15; digital data processor 16 for one or more of pre-processing and processing data to information; information recording system 17; modulator 18 for modulating information onto a carrier signal; transducer 22 for —transmitting processed, modulated signals and power using a minimum of one of electromagnetic and magnetic and magneto-inductive; a minimum of one of data pre-processing and processing using a minimum of one of data model and digital twin and machine learning (ML) and artificial intelligence (IA) analytics algorithms and the like to transform sensor data to information a minimum of one of an image feature and characteristic and development and status and health and threshold and alarm and location and movement and derived change of the measurand; receiver transducer 25 with a minimum of one of intelligent antenna and impulsive interference suppression and software defined radio and adaptive radio and cognitive radio and cognitive radio sensor network; at least one of a transmitter transducer 22 or receiver transducer 25 is located in a fluid propagating medium 26. At least a portion of a signal path 21 between the transmitter transducer 22 and the receiver transducer 25 is through the fluid propagating medium 26.

In one embodiment, the receiver transducer 25 includes at least one of: rectenna and rekoil for power transduction; power management unit 9; energy storage unit 11.

In one embodiment, a hybrid compact surveillance system 28 incorporates a minimum of one of LCT 30, acoustic 31, optical, 32, radio 33, CR 34, MI 35.

In one embodiment, the transmitter transducer 22 incorporates one or more transducers for converting EM waves to power and/or signals, selected one or more of: antenna, intelligent antenna, loop antenna, photodetector, photoresistors, phototransistors, and photomultipliers.

In one embodiment, the receiver transducer 25 incorporates one or more transducers for converting EM waves to power and/or signals, selected one or more of: antenna, rectenna, photodetector, photoresistors, phototransistors, and photomultipliers.

In one embodiment, a minimum of one of transmitter 20 frequency and power and bandwidth and resonance and receiver transducer 25 sensitivity and gain and resonance and bandwidth and signal processing is adaptable, wherein field strength at receiver transducer 25 due to the 1/r component is greater than the field due to the 1/r2 component and the field strength at receiver transducer 25 due to the 1/r component is greater than the field due to the 1/r3 component.

In one embodiment, a minimum of one of transmitter 20 frequency and power and bandwidth and resonance and receiver transducer 25 sensitivity and gain and resonance and bandwidth and signal processing is adaptable wherein the field strength at receiver transducer 25 due to the 1/r component is greater than the field due to the 1/r2 component and the field strength at receiver transducer 25 due to the 1/r component is greater than the field due to the 1/r3 component and the information transferred is not compressed.

In one embodiment, system 10 has a minimum of two sensors 42 and fusion logic is used to calculate a minimum of one parameter of the measurand 44.

In one embodiment, system 10 incorporates a minimum of one of algorithmic pre-processing and algorithmic processing and frequency and power and gain and transducer 25 sensitivity and transducer resonance 22, 25 and bandwidth and signal processing are adaptable to improve a minimum of one of energy efficiency and resilience and security and latency for a given range.

In one embodiment, system 10, a minimum of a first system 10, CSS1 that is one of mobile and portable and is integrated with a minimum of one of an underwater vehicles and a diver and a person and an animal and a surface vehicle and an aerial vehicle 23 and a second system 10, CSS2.

In one embodiment, system 10 incorporates a minimum of one of algorithmic pre-processing and algorithmic processing and frequency and power and gain and transducer 25 sensitivity and transducer resonance 22, 25 and bandwidth and signal processing are adaptable to improve a minimum of one of energy efficiency and resilience and security and latency for a given range and transducers 22, 25 are positioned to enable a minimum of part of transfer to pass through one of a minimum of one fluid boundary 29 and a minimum of one solid boundary 13.

In one embodiment, system 10 incorporates a minimum of one of algorithmic pre-processing and algorithmic processing and frequency and power and gain and transducer 25 sensitivity and transducer resonance 22, 25 and bandwidth and signal processing are adaptable to improve a minimum of one of energy efficiency and resilience and security and latency for a given range, wherein a network of system 10, a fifth system 10, CSS5 is in a first fluid propagating medium 26 and part of the signal 21 passes through a minimum of one boundary 13 to a sixth system 10, CSS6 in a first solid propagating medium 27.

In one embodiment, system 10 incorporates a minimum of one of algorithmic pre-processing and algorithmic processing and frequency and power and gain and transducer 22, 25 sensitivity and transducer resonance 22, 25 and bandwidth and signal processing are adaptable to improve a minimum of one of energy efficiency and resilience and security and latency for a given range, wherein a network of system 10, a third system 10, CSS3, is in a first fluid propagating medium 26 and a part of the signal 21 passes through a minimum of one boundary 29 to an fourth system 10, CSS4 in a second fluid propagating medium 25 wherein the field strength at the receiver transducer 25 due to the 1/r component is greater than the field due to the 1/r2 component and the field strength at the remote node due to the 1/r component is greater than the field due to the 1/r3 component.

In one embodiment, a network of system 10, a fifth system 10, CSS5 is in a first fluid propagating medium 26 and part of the signal 21 passes through a minimum of one boundary 13 to a sixth system 10, CSS6 in a first solid propagating medium 27 wherein the field strength at the receiver transducer 25 due to the 1/r component is greater than the field due to the 1/r2 component and the field strength at the remote node due to the 1/r component is greater than the field due to the 1/r3 component.

In one embodiment, a network of system 10, two system 10 CSS7 and CSS8 are in a first fluid propagating medium 26. Signal path may be either indirect 27 or direct 21 or both. Indirect signal path 27 passes from seventh system 10, CSS7 through barrier 29, through second propagating medium 25 and through barrier 29 to eighth system 10 CSS8. Direct signal path 21 passes from seventh system 10 CSS7 though fluid 26 to eighth system 10, CSS8, wherein the field strength at the receiver transducer 25 due to the 1/r component is greater than the field due to the 1/r2 component and the field strength at the remote node due to the 1/r component is greater than the field due to the 1/r3 component.

In one embodiment, a network of system 10, two system 10 CSS9 and CSS10 are in a first fluid propagating medium 26. Signal path may be either indirect 27 or direct 21 or both. Indirect signal path 27 passes from ninth system 10, CSS9 through barrier 13, through second propagating medium 19 and through the barrier 13 to tenth system 10 CSS 10. Direct signal path 21 passes from ninth system 10, CSS9 though fluid 26 to tenth system 10 CSS 10, wherein the field strength at the receiver transducer 25 due to the 1/r component is greater than the field due to the 1/r2 component and the field strength at the remote node due to the 1/r component is greater than the field due to the 1/r3 component.

In one embodiment, a network of system 10, transducers 22, 25 are placed such that signal path 21 through more than one barrier 29, 13 is sub-optimal.

In one embodiment, a network of system 10, the transducers of a seventh system CSS7 and the transducers of an eighth system 10, CSS8 are placed such that the indirect signal path 27 is greater than the direct signal path 21.

In one embodiment, a network of system 10, the transducers of a ninth system CSS9 and the transducers of a tenth system 10, CSS10 are placed such that the indirect signal path 27 is greater than the direct signal path 21.

In one embodiment, a hybrid system 28, the processor 16 is configured either to set a duty cycle to initiate one or more of the communications channels or to adapt the duty cycle based on criteria other than signal quality, range or bandwidth.

In one embodiment, system 10, a secure passive monitoring system wherein a minimum of two frequencies and a minimum of one tone length detectable using limiting comparator circuit for activation of processor 16.

In one embodiment, system 10, a low power receives 24 circuit comprising a minimum of one limiting comparator with high gain controlled by processor 16 to operate at one or more of a fixed and variable duty cycles.

In one embodiment, system 28, a minimum of three active energy settings through one or more of adaption of one or more of sensor 42 duty cycle and sensor 42 energy and pre-processing algorithm and processing algorithm and frequency and transducer 22, 25 energy and transducer 22, 25 gain and transducer 22, 25 bandwidth and communications channel; and a secure control signal comprising a minimum of one of a sequence of tones of a minimum of one tone length and a single frequency and a sequence of frequencies and a combination of tones and frequencies. Upon detection of a secure control signal by transducer 25 the energy setting of system 28 is adjusted between active energy settings.

In one embodiment, system 10 a minimum of one of encryption and data masking and data erasure and data resilience and data authentication not limited to digital ledger and blockchain and volatile memory and traps and self-destruct fuse and auto-destruct fuse and biodegradable materials and chemical release and honeypot techniques to provide for enhanced digital security.

In one embodiment, system 10, a supercapacitor is included to improve system 10 performance.

In one embodiment, system 10, comprises an information network of a minimum of three system 10.

In one embodiment, system 28, comprises an information network of a minimum of three hybrid system 28.

In one embodiment, system 10, comprises an information network of a minimum of three system 10 configured either for edge computing or as a hybrid cloud or both.

In one embodiment, system 10, an information network of a minimum of three system 10, CSS11, CSS12, CSS13 is configured such that information is transferred from an eleventh system 10, CSS 11 to a twelfth system 10, CSS12 through signal path 21. The twelfth system 10, CSS12 modifies this information through a minimum of one of removal of part of the information from the eleventh system 10, CSS11 and addition of information from the twelfth system 10, CSS12 to the information from the eleventh system 10, CSS11 and processes information from the eleventh system 10, CSS11 and twelfth system 10, CSS12 to derive new information. The resultant new information is transferred by the twelfth system 10, CSS12 to a thirteenth system 10, CSS13.

In one embodiment, system 10, a minimum of one of transducer 22 and 25 is shielded from electric field.

In one embodiment, system 10, is integrated with a cable 37 and transfers either one or both of information and power from a fourteenth system 10, CSS14 through fluid propagating medium 26 to a fifteenth system 10 CSS15.

In one embodiment, system 28, a minimum of one independent wireless sensor device IWSD 37 is configured to transfer data or information or both through fluid propagating medium 26 wherein the field strength at system 28, HCSS1 due to the 1/r component is greater than the field due to the 1/r2 component and the field strength at the remote node due to the 1/r component is greater than the field due to the 1/r3 component.

In one embodiment, system 10, a transmit loop antenna 22 with a minimum of one of a maximum of 2 turns, and manufactured of a minimum of one of low resistance and electrically insulated tube and Litz wire, and resonated and maintained in resonance by varying a minimum of one of power and frequency and capacitance and signal processing.

In one embodiment, system 10, wherein analytic models are used by digital data processor 16 to provide information for use within a minimum of one of surveillance and automation and autonomy systems to improve a minimum of one of environmental performance and carbon footprint and safety and efficiency and reliability and compliance.

In one embodiment, system 10, configured as a network of three systems wherein each system is configured to communicate with a maximum of 2 other systems, example system 10, CSS17 communicates only with system 10, CSS16 and system 10 CSS18. One or more of a watchdog timer and time syncronisation system and a token verification system is used to confirm a failure of the communications link either between system 10, CSS17 and system 10, CSS16, or between system 10, CSS17 and system 10, CSS18, or a failure of both communications links in which circumstances a new configuration is established with a further node based on a minimum of one of energy efficiency and reliability and security. As example, in event of a failure of link between system 10, CSS17 and system 10, CSS18, system 10, CSS17 will seek to establish a new communications link with system 10, CSS19.

In one embodiment, system 10, further comprising a minimum of two systems, the network architecture is asymmetric and based on as non-limiting examples primary/secondary, source/replica or provider/consumer.

In one embodiment, system 110, compact loosely coupled transformer surveillance system (LCT CSS) comprising a power input 112, a data input 114, a minimum of one sensor input 142, a minimum of one of a data memory storage 115 and an information recording system 117; processor 116 for a minimum of one of pre-processing sensor data and processing sensor data and processing pre-processed sensor data with a minimum of one analytics algorithm, as non-limiting examples: data model, digital twin, Machine Learning and Artificial Intelligence. Data is transformed by analytics algorithm to information and provides as non-limiting examples: image feature, characteristic, development, status, health, threshold, alarm, location, movement and derived change of measurand 144; modulator 118 for modulating information to loosely coupled transformer source 120 incorporating supercapacitor; sink transducer 125 incorporating rekoil and impulsive interference suppression. At least one of source transducer 122 and sink transducer 125 is located in fluid propagating medium 126. A minimum of one of power and information is transferred from source 120 to remote sink 124.

In one embodiment, systems 110, wherein the field strength at sink transducer 125 due to the 1/r2 component is greater than the field due to the 1/r component and the field strength at the sink transducer due to the 1/r3 component is greater than the field due to the 1/r component.

In one embodiment, system 128, a hybrid compacts loosely coupled transformer surveillance system (Hybrid CLCTSS), comprises system 110 and a minimum of one of LCT 130, Acoustic 131, Optical 132, Radio 133, CR 134 and MR 135.

In one embodiment, system 128, a minimum of one of frequency and gain and power and resonance and transducer sensitivity and bandwidth and signal processing is adaptable, wherein the field strength at sink transducer 125 due to the 1/r component is greater than the field due to the 1/r2 component and the field strength at sink transducer 125 due to the 1/r component is greater than the field due to the 1/r3 component.

In one embodiment, system 128, a minimum of one of frequency and gain and power and resonance and transducer sensitivity and bandwidth and signal processing is adaptable with conductive and permittivity and permeability of the fluid 126, wherein field strength at skink transducer 125 due to the 1/r component is greater than the field due to the 1/r2 component and the field strength at sink transducer 125 due to the 1/r component is greater than the field due to the 1/r3 component and information transferred is not compressed.

In one embodiment, system 128, wherein a minimum of one of algorithmic pre-processing and algorithmic processing and frequency and power and gain and transducer 122, 125 sensitivity and transducer 122, 125 resonance and bandwidth are adaptable to improve a minimum of one of energy efficiency and resilience and security and latency for a given range.

In one embodiment, a network of system 110 wherein a minimum of one system 110, LCT CSS1 that is one of mobile and portable and is integrated with a minimum of one of an underwater vehicle and a diver and a person and an animal and a surface vehicle and an aerial vehicle 123 and a second system 110, LCT CSS2.

In one embodiment, the third system 110, LCT CSS3 is in a first fluid propagating medium 126 and the signal 121 passes through a minimum of one boundary 129 to a fourth system 110, LCT CSS4 in a second fluid propagating medium 125.

In one embodiment, the fifth system 110, LCT CSS5 is in a first fluid propagating medium 126 and the signal 121 passes through a minimum of one boundary 130 to a sixth system 110, LCT CSS6 111 in a first solid propagating medium 127.

In one embodiment, a network of system 110, the transducers of a seventh system 110, LCT CSS7 and the transducers of an eighth system 110, LCT CSS8 are placed such that the indirect signal path 128 is greater than the direct signal path 121.

In one embodiment, a network of system 110, the transducers of a ninth system 110, LCT CSS9 and the transducers of a tenth system 110, LCT CSS10 are placed such that the indirect signal path 128 is greater than the direct signal path 121.

In one embodiment, system 110, a duty cycle wherein, the processor 116 a minimum of one of sets and adapts a duty cycle to control the transfer using a minimum of two transfer methods.

In one embodiment, LCT CSS system 110, a secure passive monitoring system wherein a minimum of two frequencies and a minimum of one tone length detectable using limiting comparator circuit for activation of processor 116.

In one embodiment, LCT CSS system 110, a minimum of three active energy settings through one or more of adaption of one or more of sensor 142 duty cycle and sensor 142 energy and pre-processing algorithm and processing algorithm and frequency and transducer 122, 125 energy and transducer 122, 125 gain and transducer 122, 125 bandwidth; and a secure control signal comprising a minimum of one of a sequence of tones of a minimum of one tone length and a single frequency and a sequence of frequencies and a combination of tones and frequencies. Upon detection of a secure control signal by transducer 125 the energy setting of system 110 is adjusted between active energy settings.

In one embodiment, system 110, a minimum of one of encryption and data masking and data erasure and data resilience and data authentication not limited to digital ledger and blockchain and volatile memory and traps and self-destruct fuse and auto-destruct fuse and biodegradable materials and chemical release and honeypot techniques provide for enhanced digital security.

In one embodiment, system 110, comprises an information network of a minimum of three system 10 wherein the network incorporates a minimum of one of edge computing and hybrid cloud.

In one embodiment, system 110, an information network of a minimum of three system 110 LCT CSS11, LCT CSS12, LCT CSS13 is configured such that information is transferred from an eleventh system 110, LCT CSS11 to a twelfth system 110, LCT CSS12, and the twelfth system modifies this information through a minimum of one of removal of part of the information from the eleventh system 100, LCT CSS11 and addition of information from the twelfth system 110, LCT CSS12 to the information from the eleventh system LCT CSS11 110 and processes information from the eleventh system LCT CSS11 110 and twelfth system LCT CSS12 110 to derive new information and transfers the resultant to a thirteenth system LCT CSS13 110.

In one embodiment, system 128, further comprising a minimum of one independent wireless device 137 configured to transfer one or more of data and information to system 128, Hybrid LCTCSS wherein the field strength at system 128, Hybrid CLCTSS due to the 1/r component is greater than the field due to the 1/r2 component and the field strength at the remote node due to the 1/r component is greater than the field due to the 1/r3 component.

In one embodiment, system 110, wherein analytic models are used to provide information for use within a minimum of one of surveillance and automation and autonomy systems to improve a minimum of one of environmental performance and carbon footprint and safety and efficiency and reliability and compliance.

In one embodiment, system 110, configured as an information network of three systems wherein each system is configured to communicate with a maximum of 2 other systems, example system 110, CLCTSS15 communicates only with system 110, CLCTSS14 110 and system 110, CLCTSS16 110. One or more of a watchdog timer and time syncronisation system and a token verification system is used to confirm a failure of a failure of the link either between system 110, CLCTSS15 and system 110, CLCTSS16, or between system 110, CLCTSS15 and system 110, CLCTSS14, or a failure of both links in which circumstances a new configuration is established with a further system based on a minimum of one of energy efficiency and reliability and security. As example, in event of a failure of link between system 110, CLCTSS15 and system 110, CLCTSS16, system 110, CLCTSS15 will seek to establish a new link with system 110, CLCTSS17.

In one embodiment, system 210, radio compact surveillance system (RCSS) comprising a power input 212, a data input 214, a minimum of one sensor input 242, a minimum of one of a data memory storage 215 and an information recording system 217; processor 216 for a minimum of one of pre-processing sensor data and processing sensor data and processing pre-processed sensor data with a minimum of one analytics algorithm as non-limiting examples, data model, digital twin, Machine Learning, Artificial Intelligence and data fusion. Data is transformed by analytics algorithm to information and provides as nonlimiting examples one or more of image feature, characteristic, development, status, health, threshold, alarm, location, movement and derived change of the measurand 244; modulator 218 for modulating information to transmitter 220; transmitter antenna 222; receiver antenna 225; receiver 224. At least one of transmitter antenna 222 and receiver antenna 225 is located in fluid propagating medium 226 and a minimum of one of transmitter and receiver is operable to communicate in the near field where the field strength corresponds to ear where a is a corrected for the medium save in a vacuum is the value of an integer.

In one embodiment, system 228, a hybrid radio compact surveillance system (HRCSS), comprises system 210 and a minimum of one of LCT 230, Acoustic 231, Optical 232, Radio 233, CR 235 and MI 235.

In one embodiment, system 210 information is not compressed.

In one embodiment, system 210, wherein a minimum of one of algorithmic pre-processing and algorithmic processing and frequency and power and gain and transducer sensitivity and transducer resonance and bandwidth are adaptable to improve a minimum of one of energy efficiency and resilience and security and latency for a given range.

In one embodiment, system 210, a minimum of a first system 210, RCSS1 one of mobile and portable and is integrated with a minimum of one of an underwater vehicles and a diver and a person and an animal and a surface vehicle and an aerial vehicle 223, and a second system 210, RCSS2.

In one embodiment, system 210 incorporates a minimum of one of algorithmic pre-processing and algorithmic processing and frequency and power and gain and transducer 225 sensitivity and transducer resonance 222, 225 and bandwidth and signal processing are adaptable to improve a minimum of one of energy efficiency and resilience and security and latency for a given range, wherein a network of system 210, the third system 10, RCSS3, is in a first fluid propagating medium 226 and a part of the signal 221 passes through a minimum of one boundary 229 to a fourth system 210, RCSS4 in a second fluid propagating medium 225.

In one embodiment, system 210 incorporates a minimum of one of algorithmic pre-processing and algorithmic processing and frequency and power and gain and transducer 225 sensitivity and transducer resonance 222, 225 and bandwidth and signal processing are adaptable to improve a minimum of one of energy efficiency and resilience and security and latency for a given range, wherein a network of system 210, a fifth system 10, RCSS5 is in a first fluid propagating medium 226 and part of the signal 221 passes through a minimum of one boundary 213 to a sixth system 210, RCSS6 in a first solid propagating medium 227.

In one embodiment, a network of system 210, transducers 222, 225 are placed such that signal path 221 through more than one barrier 229, 213 is sub-optimal.

In one embodiment, a hybrid system 228, the processor 216 is configured either to set a duty cycle to initiate one or more of the communications channels or to adapt the duty cycle based on criteria other than signal quality, range or bandwidth.

In one embodiment, system 210, a secure passive monitoring system wherein a minimum of two frequencies and a minimum of one tone length detectable using limiting comparator circuit for activation of the processor 216.

In one embodiment, system 210, a minimum of three active energy settings through one or more of adaption of one or more of sensor 242 duty cycle and sensor 242 energy and pre-processing algorithm and processing algorithm and frequency and transmitter antenna 222, receiver antenna 225 energy and transmitter antenna 222, receiver antenna 225 gain and system bandwidth; and a secure control signal comprising a minimum of one of a sequence of tones of a minimum of one tone length and a single frequency and a sequence of frequencies and a combination of tones and frequencies. Upon detection of a secure control signal by receiver antenna 225 the energy setting of system 210 is adjusted between active energy settings.

In one embodiment, system 210, a minimum of one of encryption and data masking and data erasure and data resilience and data authentication not limited to digital ledger and blockchain and volatile memory and traps and self-destruct fuse and auto-destruct fuse and biodegradable materials and chemical release and honeypot techniques provides for enhanced digital security.

In one embodiment, system 210, comprises an information network of a minimum of three system 10 configured either for edge computing or as a hybrid cloud or both.

In one embodiment, system 210, an information network of a minimum of three system 210, RCSS1, RCSS2, RCSS3 is configured such that information is transferred from an eleventh system 10, RCSS11 to a twelfth system 10, RCSS12 through signal path 221. The twelfth system 10, RCSS12 modifies this information through a minimum of one of removal of part the information from the eleventh system 210, RCSS11 and addition of information from the twelfth system 210, RCSS12 to the information from the eleventh system 210, RCSS11 and processes information from the eleventh system 210, RCSS11 and twelfth system 210, RCSS12 to derive new information. The resultant new information is transferred by the twelfth system 210, RCSS12 to a thirteenth system 210, RCSS13.

In one embodiment, system 228, a minimum of one independent wireless device IWSD1 237 is configured to transfer data or information or both through fluid propagating medium 226 wherein the field strength at system 228 due to the 1/r component is greater than the field due to the 1/r2 component and the field strength at the remote node due to the 1/r component is greater than the field due to the 1/r3 component.

In one embodiment, system 210, wherein analytic models are used to provide information for use within a minimum of one of surveillance and automation and autonomy systems to improve a minimum of one of environmental performance and carbon footprint and safety and efficiency and reliability and compliance.

In one embodiment, system 210, configured as a network of three systems wherein each system is configured to communicate with a maximum of 2 other systems, example RCSS12 210 communicates only with RCSS10 210 and RCSS13 210. One or more of a watchdog timer and time syncronisation system and a token verification system is used to confirm a failure of the communications link either between system 210, RCSS17 and system 210, RCSS16, or between system 210, RCSS17 and system 210, RCSS18, or a failure of both communications links in which circumstances a new configuration is established with a further node based on a minimum of one of energy efficiency and reliability and security. As example, in event of a failure of link between RCSS12 210 and RCSS13 210, RCSS12 210 will seek to establish a new link with RCSS14 210.

In one embodiment, system 210, a network of a minimum of two systems wherein the network architecture is asymmetric and based on as non-limiting examples primary/secondary, source/replica or provider/consumer.

In one embodiment, system 310, compact SEM compact surveillance system SEM CSS), comprises subsea electronics module (SEM) 341 with a minimum of one of an available port 355 and a wireless link 355; hybrid compact surveillance system 360, HCSS1 comprising: a minimum of one sensor 342, a minimum of two of LCT and MI and acoustic and radio and CR communications links, a minimum of one of continuous and duty cycle control of communications; a minimum of one remote hybrid compact surveillance system 358, HCSS2 comprising: power input 312, sensor input 342, minimum of one of data memory storage 315 and an information recording system 317; processor 316 for a minimum of one of pre-processing sensor 342 data and processing sensor data and processing pre-processed sensor data; a minimum of one analytics algorithm including but not limited to data model and digital twin and Machine Learning and Artificial Intelligence and data fusion. Sensor 342 data is transformed by the analytics algorithm in processor 316 to information and provides a minimum of one of an image feature and characteristic and development and status and threshold and alarm and location and movement and derived change of the measurand 344, a smart transducer system 322, 325 incorporating a minimum of one of intelligent antenna and impulsive interference suppression and software defined radio and adaptive radio; minimum of one of system 360, HCSS1 and remote intelligent measurand surveillance system 360, HCSS2 is in a fluid 326.

In one embodiment, system 370, compact temperature gradient surveillance system (TG CSS), comprises a power input 312; a minimum of two temperature gradient sensors 374 integrated with an attachment mechanism 376 including but not limited to strap, band, collar, clamp, suction cup, buckle, harness, snap bracelet, glue, spring-loaded, hydraulic, screw-controlled and weld. The thermal conductivity along the length of each thermal gradient sensor 374 is a minimum of one of fixed and stepped and variable and adaptable. Temperature gradient sensors 374 are positioned so that a minimum of one of thermal gradient and temperature time constant and properties of the measurand 344 may be derived by calculation. A minimum of one of a data memory storage 315 and an information recording system 317. A processor 316 for a minimum of one of pre-processing sensor data and processing sensor data and processing pre-processed sensor data. A minimum of one of analytics algorithm including but not limited to data model and digital twin and Machine Learning and Artificial Intelligence and data fusion. Sensor 374 data is transformed by analytics algorithm in processor 316 to information and provides a minimum of one of a features and characteristic and development and status and health and threshold and alarm and location and movement and derived change of measurand 344. Modulator 318 modulates information onto a carrier signal. Information is transferred from transducer 322 to a remote transducer 325 using a minimum of one of LCT and magneto-inductive and radio and cognitive radio and acoustic and optical communications. TG sensors 274 are positioned so that a minimum of one of thermal gradient and temperature time constant and thermal properties of the measurand 344 may be derived by calculation.

In one embodiment, system 380, a hybrid sensor compact surveillance system (HS CSS) comprising a power input 312, a source/transmitter 320; a minimum of one of LCT and MI and radio and CR and optical and acoustic communications; processor 316 for a minimum of one of pre-processing sensor data and processing sensor data and processing pre-processed sensor data; a minimum of one analytics algorithm including but not limited to data model and digital twin and Machine Learning and Artificial Intelligence and data fusion; wherein a minimum of one of a transducer 322, 325 and oscillator and modulator 318 and DSP is used by a minimum of one communications subsystem 320, 322, 324, 325 and one sensor 342 including as non-limiting examples Eddy Current corrosion, cathodic protection, ultrasonic thickness, pH, temperature, temperature gradient, water density, turbidity, bio-fouling build-up, water conductivity, water salinity, water density, water current, strain, chemical composition, electromagnetic field, magnetic field, gravitational field, flow, flow velocity, speed-of-sound, speed-of-EM propagation, light, pressure, image.

In one embodiment, system 380 wherein, a speed of propagation in fluid 326 is measured at a minimum of two frequencies, and used to calculate a minimum of one parameter of fluid 326 as non-limiting examples: speed-of-sound, speed-of-EM field propagation, speed-of-magnetic field propagation, pH, density, conductivity, salinity, chemical composition, velocity, current, biofouling, turbidity, corrosion.

In one embodiment, system 380, hybrid compact surveillance system comprising a power input 312, a source/transmitter 320 with a minimum of one of LCT and MI and radio and CR and optical and acoustic used both for communications and sensing; and processor 316 for a minimum of one of pre-processing sensor data and processing sensor data and processing pre-processed sensor data; and a minimum of one of analytics algorithm including but not limited to data model and digital twin and Machine Learning and Artificial Intelligence and data fusion; and a minimum of one of frequency and power and gain and transducer sensitivity and transducer resonance and bandwidth and signal processing are adaptable to derive minimum of one of location and relative location and alignment and movement and object detection; wherein at least one of transducer 322 and remote transducer 325 is in a fluid.

In one embodiment, system 390, a scour surveillance system comprising a plurality of system 328, hybrid compact surveillance system (HCSS), each system 328 comprising: a power input 312, a sensor input 342, a minimum of one of a data memory storage 315 and an information recording system 317, processor 316 for a minimum of one of pre-processing sensor data and processing sensor data and processing pre-processed sensor data; a minimum of one analytics algorithm including but not limited to data model and digital twin and Machine Learning and Artificial Intelligence. Sensor data is transformed by analytics algorithm to information and provides as non-limiting examples one or more of: image feature, characteristic, development, status, health, threshold, alarm, location, movement and derived change of measurand. Modulator 318 for modulating the information onto a carrier signal; radio transmitter 320 and a minimum of one of LCT and MI and acoustic and CR; processor 316 configured to a minimum of set a duty cycle for a minimum of one communications channels and to adapt the duty cycle of a minimum of one communications channel; a minimum of one of frequency and power and bandwidth and resonance and transducer sensitivity and gain and signal processing is adaptable; the field at remote transducer 325 due to the radio 1/r component is greater than the field due to the 1/r2 component and the field strength at the remote system due to the 1/r component is greater than the field due to the 1/r3 component; a minimum of two systems 328 are attached to subsea structure 392 above the seabed 394; and a minimum of one system 328 is attached to a subsea structure 392 below the seabed 394; transducers 322, 325 are located in an opening in the structure wall 397; the field strength of each inter-system link is measured and compared at a minimum of one frequency; and the data derived is processed to calculate the location of seabed 394; information describing a minimum of one of the extent and rate of and variability of seabed 394 scouring is transferred to monitoring system 398.

In one embodiment, system 320, a measurand compact surveillance system (MCSS), comprising a sensor 342 to measure a minimum of one of process performance and an integrity parameter and an environmental parameter, and a health parameter; and an attachment mechanism 376 to measurand 344, a minimum of one of a pipeline and a structure and a skid and a person and an animal, using a minimum of one of magnetic clamp and suction cup and strap and snap bracelet and Velcro and clamp and glue and weld and fastener; a minimum of one of a data memory storage 315 and an information recording system 317; processor 316 for a minimum of one of pre-processing sensor data and processing sensor data and processing pre-processed sensor data; a minimum of one analytics algorithm including but not limited to data model and digital twin and Machine Learning and Artificial Intelligence; sensor 342 data is transformed by analytics algorithm to information and provides a minimum of one of an image feature and characteristic and development and status and health and threshold and alarm and location and movement and derived change of measurand 344; modulator 318 for modulating the information onto a carrier signal; transducer 322 for transferring information to remote transducer 325 using a minimum of radio and one of LCT and MI and radio and CR and acoustic and optical; the field at remote transducer 325 due to the radio transducer 322 1/r component is greater than the field due to the 1/r2 component and the field strength at remote transducer 325 due to the 1/r component is greater than the field due to the 1/r3 component; wherein at least one of transducer 322 and remote transducer 325 is in a fluid 326.

As a non-limiting example, super caps allow smaller battery packs to be used leading to reduced product cost. In one embodiment, a e.g., supercapacitor (SC), also called an ultracapacitor, is high-capacity capacitor with a capacitance value higher than other capacitors, but with lower voltage limits. This bridges a gap between electrolytic capacitors and rechargeable batteries. As a non-limiting example SC provide a storage of 10 to 100 times more energy per unit volume or mass than electrolytic capacitors.

As a non-limiting example, SC can accept and deliver charge much faster than batteries, and tolerates many more charge and discharge cycles than rechargeable batteries.

Systems 10, 110, 210 and 310 can be used with the following:

In one embodiment, supercapacitors are used in applications requiring many rapid charge/discharges cycles, rather than long term compact energy storage in automobiles, buses, trains, cranes and elevators, and the like. In one embodiment they are used for regenerative braking, short-term energy storage, or burst-mode power delivery, smaller units are used as power backup for static random-access memory (SRAM).

Unlike ordinary capacitors, supercapacitors do not use the conventional solid dielectric, but rather, they use electrostatic double-layer capacitance and electrochemical pseudo capacitance, both contributing to the total capacitance of the capacitor, with a few differences:

Electrostatic double-layer capacitors (EDLCS) use carbon electrodes or derivatives with much higher electrostatic double-layer capacitance than electrochemical pseudo capacitance. These achieve separation of charge in a Helmholtz double layer at an interface between the surface of a conductive electrode and an electrolyte. Separation of charge is of the order of a few angstroms (0.3-0.8 nm) and is smaller than in a conventional capacitor.

Electrochemical pseudo capacitors use metal oxide or conducting polymer electrodes with a high amount of electrochemical pseudo capacitance additional to the double-layer capacitance, pseudo capacitance is achieved by faradaic electron charge-transfer with redox reactions, intercalation or electro sorption.

Hybrid capacitors, such as the lithium-ion capacitor, use electrodes with differing characteristics: one exhibiting mostly electrostatic capacitance and the other mostly electrochemical capacitance. The electrolyte forms an ionic conductive connection between the two electrodes which distinguishes them from conventional electrolytic capacitors where a dielectric layer always exists, and the so-called electrolyte, e.g., mno2 or conducting polymer. This is part of the second electrode (the cathode, or more correctly the positive electrode). Supercapacitors are polarized by design with asymmetric electrodes, or, for symmetric electrodes, by a potential applied during manufacture.

In another embodiment another design element improves the signal performance. As non-limiting examples, ANS and Dicke-Fix may optionally be adapted to improve signal performance of LCT. As a non-limiting example, the performance improvement can be used to improve energy efficiency by reducing the source energy required and/or to increase the range performance of the system in adverse environments.

In one embodiment, Dicke-Fix processing is a circuit in radar signal processing for improving the signal-to-noise ratio. It can be used in older electronic protective measures (EPM) systems.

This form of radar signal processing can be implemented in the IF amplifier. In one embodiment, a broadband amplifier is followed by a limiter. The signal is further processed in a narrow-band signal-adapted IF amplifier. This attenuates signals that are too long (clutter) or too short (noise peaks and pulse interference). The Dicke-Fix principle can be used to protect the receiver from noise interference; and from interference from fast wobbled or narrowband pulse-modulated interference transmitters. As a non-limiting example, Dicke-Fix can be used in MPR air defence radar.

As a non-limiting example, a Dicke-Fix circuit includes the following components including but not limited to intermediate frequency amplifier, operational amplifiers, band pass filter, diodes.

As a non-limiting example Dicke-Fix includes a broadband limiting IF amplifier, followed by an IF amplifier of optimum bandwidth. As a non-limiting the limit level is present at approximately the peak amplitude of receiver noise. In one embodiment, the bandwidth can vary from 10 to 20 MHz, depending on the jamming environment. This causes a constant false alarm rate over a wide range of the sweep. The "Dickie Fix"—radar signal processing provides excellent discrimination against fast sweep jamming (10-500 MHz), usually something on the order of 20 to 40 DB, without appreciable loss in sensitivity.

An echo returns with the expected band (i.e., the expected pulse width) that is a higher amplitude than the noise and the interference pulses at the filters output. The noise and the interference pulses can be eliminated by the following threshold-device. However, strong CW jamming can \degrade the performance of the Dicke-Fix-receiver because the strong CW signal (and slowly swept jamming) over-modulates the receiver.

In one embodiment, ARM MONO is used as a generation of ultra-low power processors with integrated sleep mode to reduce power consumption.

In one embodiment, power-saving receive circuit is used to reduce power consumption.

As a non-limiting example, rekoil is a 'rectenna' for LCT systems incorporated in LCT designs.

In one embodiment, a special type of receiving antenna is used for converting electromagnetic energy into direct current (DC) electricity. These can be used in wireless power transmission systems that transmit power by radio waves. In one embodiment, a simple rectenna element includes a dipole antenna with an RF diode connected across the dipole elements. The diode rectifies AC induced in the antenna by the radio waves. This produce DC power that is used for a load connected across the diode. Schottky Diodes can be used because they have the lowest voltage drop and highest speed and therefore have the lowest power losses due to conduction and switching. Large rectennas Can include an array of many such dipole elements.

In one embodiment, a special type of sink transducer is used for converting induction field energy to energy. These can be used in transfer systems that transfer power by induction fields. In one embodiment, a simple rekoil element includes a coil with a diode connected across the coil. The diode rectifies AC induced in the coil by the induction field. This produce DC power that is used for a load connected across the diode. Schottky Diodes can be used because they have the lowest voltage drop and highest speed and therefore have the lowest power losses due to conduction and switching.

In one embodiment, a lattice hybrid is used that is a lattice wireless system with 2 or more wireless comms technologies including but not limited to one or more of: acoustic; free space optics; Bluetooth; WiFi; and the like.

A 3g/4g/5g system can be configured in a number of embodiments including but not limited to: technology selection; the system selects the technology for comms, other technologies put to sleep or into ultra-low power states; duty cycle management: 2 or more technologies operate in parallel with duty cycles adjusted to match the system needs. This may be to permit 1 technology to dominate comms at any point of time; and the like.

In one embodiment, Biofouling build-up surveillance is provided. As non-limiting examples, these can be a build-up of biofouling on subsea cables and jumpers leading to fatigue, damage and failure. As a non-limiting example this can be monitored by divers and/or vehicles with cameras.

In one embodiment, a system is provided of automating the monitoring of build-up of biofouling on a subsea cable or structure. In one embodiment, smart wireless devices with one or more integrated sensors including but not limited to accelerometer and/or inclinometer and/or microphone and/or temperature and/or water current and/or water conductivity and/or water turbidity and the like. Movement, vibration and/or noise generated around the cable and other parameters are monitored over time.

Changes in system characteristics are monitored to determine if biofouling build-up is occurring and if so optionally to monitor the rate of build-up and/or the nature of the biofouling and/or the extent of biofouling. A build-up of biofouling may be characterised by changes in the movement and/or resonant frequency of the cable or structure. The use of data fusion may optionally improve characterisation and discrimination leading to improved quality and timeliness of information regarding the rate and/or extent of biofouling build-up.

In one embodiment, an actuation device, such as a linear actuation motor, can induce vibration and/or movement in the cable. The actuator may be configured to operate and one or more frequencies and/or amplitudes. Sensors such as accelerometer and/or inclinometer are configured to measure the movements induced. Changes in response over time are correlated against biofouling build-up.

In one embodiment, a linear actuator is an actuator that creates motion in a straight line, this is in contrast to circular motion of a conventional electric motor.

In one embodiment, piezoelectric actuators are used. The piezoelectric effect is a property of certain materials in which application of a voltage to the material causes it to expand. Very high voltages correspond to only tiny expansions. Piezoelectric actuators can achieve extremely fine positioning resolution, but can a short range of motion. In one embodiment, piezoelectric materials exhibit hysteresis which makes it difficult to control their expansion in a repeatable manner.

In one embodiment, twisted and coiled polymer (TCP) actuators are used. Twisted and coiled polymer (TCP) actuator, also known as a supercoiled polymer (SCP) actuator is a coiled polymer that can be actuated through resistive heating. As a non-limiting example, a TCP actuator looks like a helical spring. In one embodiment, TCP actuators are made from silver coated nylon. In one embodiment, TCP actuators can also be made from other electrical conductance coating, including but not limited to as gold. In one embodiment, twist induced TCP actuators are under a load to keep the muscle extended. The electrical energy transforms to thermal energy due to electrical resistance, also known as joule heating, ohmic heating, and resistive heating. As the temperature of the TCP actuator increases by joule heating, the polymer contracts and it causes the actuator contraction.

In one embodiment, electro-mechanical actuators are utilized. In one embodiment, electro-mechanical actuators are similar to mechanical actuators except that the control knob or handle is replaced with an electric motor. Rotary motion of the motor is converted to linear displacement. As a non-limiting example, electromechanical actuators are used to power a motor that converts electrical energy into mechanical torque. In various embodiments, different designs of modern linear actuators can be used.

In one embodiment, an electric motor is mechanically connected to rotate a lead screw. As a non-limiting example, a lead screw has a continuous helical thread machined on its circumference running along the length, similar to the thread on a bolt. In one embodiment, threaded onto the lead screw is a lead nut or ball nut with corresponding helical threads. The nut is prevented from rotating with the lead screw, typically the nut interlocks with a non-rotating part of an actuator body. When the lead screw is rotated the nut will be driven along the threads. The direction of motion of the nut depends on the direction of rotation of the lead screw. By connecting linkages to the nut, the motion can be converted to usable linear displacement. As a non-limiting example, the actuator can be built for high speed, high force, or a compromise between the two. In one embodiment, the actuator specifications are travel, speed, force, accuracy, and lifetime. In one embodiment, the actuator can be mounted on dampers or butterfly valves.

AIoT systems may optionally fuse data from multi-sensor systems to derive an improved understanding of biofouling build-up. Information may optionally be periodically provided by wireless link such as LCT and/or other wireless technologies to assist with determining when best to intervene to clean and/or repair and/or replace key parts. Information derived can be used to assist with determining the effectiveness of biofouling mitigation techniques including the use of coatings, construction materials and/or other techniques.

In one embodiment the smart device may optionally be encapsulated in same material as cable; strapped to cable using diver straps.

In one embodiment conductivity/salinity sensor are provided. As a non-limiting example, seawater salinity is often measured using conductivity sensors. It may be standalone or part of a Conductivity, Temperature, Depth (CDT) sonde. The most commonly used methods of measuring conductivity require probes to be inserted in the fluid.

In one embodiment, electrical conductivity is an indicator of water quality. Conductivity data can determine concentration of solutions, detect contaminants and determine the purity of water. YSi conductivity sensor measures conductivity by ac voltage applied to nickel electrodes. These electrodes are placed in a water sample (or other liquid), where the current flows through the electrodes and the sample. Current level has a direct relationship with the conductivity of the solution.

In one embodiment, conductivity is the ability of a material to conduct electrical current. The principle by which instruments measure conductivity is simple—plates/wires are placed in the sample, a potential is applied across them (normally a sine wave voltage), and the current is measured. Conductivity, the inverse of resistivity is determined from the voltage and current values according to Ohm's law.

Because the charge on ions in solution facilitates the conductance of electrical current, the conductivity or a solution is proportional to its ion concentration. In some situations, however, conductivity may not correlate directly to concentration. Ionic concentrations can alter the linear relationship between conductivity and concentration in some highly concentrated solutions. The basic unit of conductivity is the siemens (s), sometimes referred to as mho. Since cell geometry affects conductivity values, standardized measurements are expressed in specific conductivity units (S/cm) to compensate for variations in electrode dimensions. Conductivity measurements, along with temperature, also allow for salinity values to be calculated through algorithms.

In one embodiment, inductive conductivity measurement is used.

As a non-limiting example, alternating current flowing through a primary coil (emitter) induces an alternating magnetic field, which in turn induces a current in the surrounding medium. The current flow in the medium on its side produces a magnetic field which induces a tension and consequently a flowing current in the secondary coil (receiver). The current which can be measured is the parameter for the conductivity of the medium.

As the conductivity of a liquid depends significantly on the temperature, an additional detector in the sensor tip continuously measures the temperature of the medium. The influence of the temperature is compensated by the temperature coefficient value pre-set in the electronic device.

In one embodiment, conductivity sensors from an Anderaa are compact, fully integrated sensors for measuring the electrical conductivity of seawater. Conductivity is a key parameter for in-situ measurements of several fundamental physical properties of seawater.

In one embodiment, a CTD or sonde is an oceanography instrument used to measure the conductivity, temperature, and pressure of seawater (the d stands for "depth," which is closely related to pressure). The reason to measure conductivity is that it can be used to determine the salinity.

In one embodiment, the CTD may be incorporated into an array of niskin bottles referred to as a carousel or rosette. The sampling bottles close at predefined depths, triggered either manually or by a computer, and the water samples may subsequently be analysed further for biological and chemical parameters. In one embodiment, the CTD may also be used for the calibration of sensors.

In one embodiment, inductive conductive sensing is integrated with LCT systems using one or more common parts to reduce the size and cost of the system, including but not limited to: a coil; modulation electronics; and DSP.

As a non-limiting example, alternatively or in parallel the system is configured to measure difference in propagation constant at the same current level. In one embodiment, the conductivity sensor may use a small coil such as 1 cm2. The antenna may optionally be printed. Two or more frequencies are used to improve system accuracy. Radio such as WiFi 2.4/5 gGhz over 2G, 3G, 4G, 5G, Bluetooth/BLE, and the like may optionally be used.

As a non-limiting example, the sensor circuit may optionally incorporate a ldo low drop out regulator with precise voltage drive. As a non-limiting example temperature compensation may optionally be used to improve accuracy.

In one embodiment, all water existing at or near the surface of the earth belongs to the hydrosphere. It includes atmospheric water vapor, groundwater, lakes, rivers, polar icecaps and the oceans.

The waters of the oceans and seas cover more than 70 percent of the earth's surface. The water that is most often found in nature is the seawater. It is about 98%, existing on the globe as seas and oceans. The rest is distributed as ice, water vapor, and fresh water on land. Oceanic waters play a very important role in controlling the global weather and climate, interactions between atmosphere and the hydrosphere and maintaining water balance of the globe. The oceans also provide enormous living and non-living resources for many life forms to survive. Seawater has a very unique chemistry, physics and biology. Seawater is a good and effective solvent. Seawater is also at the receiving end to dissolve all the sediments derived from land. Rivers carry much of the dissolved organic and inorganic substances towards the sea. These loads increase the salts of the oceans every year, resulting in conservative and non-conservative properties. Seawater has several unique properties like, high heat capacity, latent heat of fusion (lhf), latent heat of vaporization, latent heat of melting, thermal expansion, density, viscosity and turbidity. The speed of sound travelling in seawater is about 1500 m per second and some low frequencies travel for long distances. Hence, it is possible to analyse the depth of the seas and oceans using sound waves. Seawater is a complex mixture of water, salts and many other organic and inorganic substances.

Seawater contains more dissolved ions than all other types of water like river water, rainwater, lake water and groundwater. It contains 96.5 percent water, 2.5 percent salts, and smaller amounts of other substances, including dissolved inorganic and organic materials, particulates, and a few atmospheric gases. At the ocean-atmosphere interface, gases are added to seawater by diffusion and wave action. Hence, seawater contains various dissolved atmospheric gases, chiefly nitrogen, oxygen, argon, and carbon dioxide. Gas composition at the ocean surface is in equilibrium with atmosphere. Gas composition changes with time and depth in the oceans.

As salinity increases, the amount of gas dissolved decreases because more water molecules are immobilised by the salt ion. Gases like oxygen and CO2 are influenced by the sea life. Plants reduce the concentration of CO2 in the presence of sunlight, whereas, animals do the opposite whether in light or darkness. The solubility of gases in seawater is controlled by the temperature, salinity and pressure.

All gases are less soluble as temperature increases. When water is warmed, most of the gas bubbles leave the liquid. The solubility of gases in seawater decreases as water temperature increases, the increased mobility of gas molecules makes them escape from the water, thereby reducing the amount of gas involved. Plants reduce the concentration of carbon dioxide in the presence of sunlight, whereas animals do the opposite in either light or darkness.

The conservative gases nitrogen and argon do not contribute to life processes, even though nitrogen gas can be converted by some bacteria into fertilizing nitrogen compounds (NO3, NH4). All gases are less soluble as temperature increases, particularly nitrogen, oxygen and carbon dioxide which become about 40-50% less soluble with an increase of 25° C. When water is warmed, it becomes more saturated, eventually resulting in bubbles leaving the liquid. The speed of sound in the oceans varies between 1,450 and 1,570 metres per second. It increases about 4.5 metres per second for each 1Deg C. increase in temperature and 1.3 metres per second for each 1 psu increase in salinity. pH is another important property of seawater. It is reflected in the form of acidity and alkalinity. pH in the oceans varies from about 7.90 to 8.20. The pH of the surface of the ocean is about 8.1. Acidity affects sound absorption. Sound absorption in seawater is much greater than that in pure water. Two chemicals present in seawater in small amounts, magnesium sulphate and borate ions, are primarily responsible for the additional sound absorption. Sound absorption due to magnesium sulphate does not depend on ocean pH, but absorption due to borate ions does. This effect occurs at frequencies below a few kHz. A decrease in ocean acidity by about 0.45 pH units results in a decrease in sound absorption by about 50% for frequencies below about 1 kHz. As a result, low-frequency sound would have to travel twice as far to lose the same amount of energy to absorption.

In one embodiment, a formula used by the National Physics Laboratory in the UK shows that the attenuation of sound in seawater at 3 kHz when the temperature is 8Deg C., depth 5 m and salinity 35 ppt increases from 0.18 dB/km to 0.199 dB/km as pH increases from 8 to 8.1 in accordance with a formula developed by Francois and Garrison in 1982.

Photosynthesis, chemosynthesis, primary productivity and nutrient cycling are the major processes helpful in marine life survival and maintain the ecology of oceans. The availability of light controls the plant growth and phytoplankton distributions in the ocean. Phosphorous and nitrogen compounds are necessary for phytoplankton growth. These two compounds are more abundant in deep waters than the near surface waters, as they are removed by plant growth near the surface. Dissolved organic matter remains in the ocean for very long periods of time and maybe many thousands of years. There are many sources of organic matter. Decomposition of dead plant and animal is one source.

Secretion of organic compounds by living plants is also another source. Particles dispersed in seawater influence the chemical and biological behaviour of seawater. The total amount of particles in the oceans is about 10,000 million tons. Biological particles are relatively large ranging from 1 micrometre to 1 mm. These constitute up to 70% of the particulate matter in the ocean. Oxygen dissolved in seawater participates in both biological and chemical processes of oceans. It comes from the atmosphere.

When nutrients concentrations are high, dissolved oxygen concentrations are low. Oxygen dissolves by diffusion from the surrounding air; aeration of water that has tumbled over falls and rapids; and as a waste product of photosynthesis. Fish and aquatic animals cannot split oxygen from water (H2O) or other oxygen-containing compounds.

How much dissolved oxygen an aquatic organism needs depends upon its species, its physical state, water temperature, pollutants present, and more. Numerous scientific studies suggest that 4-5 parts per million (ppm) of dissolved oxygen is the minimum amount that will support a large, diverse fish population. dissolved oxygen dissolved oxygen. The dissolved oxygen level in good fishing waters generally averages about 9.0 parts per million (ppm).

Adequate dissolved oxygen is necessary for good water quality. Oxygen is a necessary element to all forms of life. Total dissolved gas concentrations in water should not exceed 110 percent. The oceans are considered to be the world's carbon reservoirs. It is evident based on the following statistics: carbon reservoir percentage CO2 dissolved in oceans—87.5%; dissolved organic carbon (DOC) in oceans—7.1%; biosphere, all living organisms—4.0%; atmospheric CO2—1.4%.

The oceans are the major recipient of the sun's radiant energy. It has the capacity to store heat. Many physical processes depend on temperature of waters. In oceanographic studies, platinum-resistance thermometers are used to measure the temperature of waters. The distribution of temperature in the surface of the oceans follows a zonation pattern. It is independent of longitude. The warmest water is near the equator and the coldest water is near the polar regions. Heat fluxes, evaporation, rain, river water inflow, freezing and melting of ice caps, all influence the distribution of temperature in the oceans.

Changes in temperature and salinity can increase or decrease the density of ocean waters at the surface which can lead to convection. The temperature of the world's ocean is highly variable over the surface of the ocean, ranging from less than 0° C. near the poles to more than 29° C. in the tropics. Variations in total salinity and in temperature cause variations in the density of seawater also. Several biotic and abiotic factors can cause the salinity to deviate from the common value of 35. The inflow of river water and rainwater decreases the salinity.

Excess evaporation or formation of pack ice causes the salinity to increase. Three general layers are present, except in polar regions where only one or two layers are present because of coldness: shallow surface mixed zone (2%)—this is the warmest zone made from solar energy, mixed by waves, around 500 m in thickness and the most saline zone; Transition zone (18%)—this zone includes thermocline, which is the point of great drop-off in temperature existing below 3000 m and halocline, which is the point of salinity drop off, which is roughly corresponding to the thermocline; Deep zone (80%)—located just above or below freezing point. This is not a saline zone. Ionic concentration of the oceans is the amount (by weight) of salt present in water and can be expressed in parts per million (ppm). The classification of water based on total salt content is: (a) fresh water—less than 1,000 ppm; (b) slightly saline water—from 1,000 ppm to 3,000 ppm; (c) moderately saline water—from 3,000 ppm to 10,000 ppm; (d) highly saline water—from ppm to 35,000 ppm; (e) ocean water has a salinity that is approximately 35,000 ppm.

In one embodiment, slugging occurs when large plugs of a liquid or gas travel along a pipeline in a multi-phase system. They can cause considerable damage to a system. Slug catcher is the name of a unit in the gas or petroleum industry in which slugs at the outlet of pipelines are collected or caught. A slug is a large quantity of gas or liquid that exits in the pipeline. Slug pipelines that transport both gas and liquids together, known as two-phase flow, can operate in a flow regime known as slugging flow or slug flow.

Under the influence of gravity, liquids tend to settle on the bottom of the pipeline. The gases occupy the top section of the pipeline. Under certain operating conditions gas and liquid are not evenly distributed throughout the pipeline and travel as large plugs with mostly liquids or mostly gases through the pipeline. These large plugs are called slugs. Slugs exiting the pipeline can overload the gas/liquid handling capacity of the plant at the pipeline outlet. As they are often produced at a much larger rate than the equipment is designed for slugs can be generated by different mechanisms in a pipeline. Terrain slugging is caused by the elevations in the pipeline, which follows the ground elevation or the seabed.

Liquid can accumulate at a low point of the pipeline until sufficient pressure builds up behind it. Once the liquid is pushed out of the low point, it can form a slug. Hydrodynamic slugging is caused by gas flowing at a fast rate over a slower flowing liquid phase. The gas will form waves on the liquid surface, which may grow to bridge the whole cross-section of the line. This creates a blockage on the gas flow, which travels as a slug through the line. Riser-based slugging, also known as severe slugging, is associated with the pipeline risers often found in offshore oil production facilities.

Liquids accumulate at the bottom of the riser until sufficient pressure is generated behind it to push the liquids over the top of the riser, overcoming the static head. Behind this slug of liquid follows a slug of gas, until sufficient liquids have accumulated at the bottom to form a new liquid slug. Pigging slugs are caused by pigging operations in the pipeline. The pigging is designed to push all or most of the liquid's contents of the pipeline to the outlet. This intentionally creates a liquid slug.

In one embodiment, slugs formed by terrain slugging, hydrodynamic slugging or riser-based slugging are periodical in nature. Whether a slug is able to reach the outlet of the pipeline depends on the rate at which liquids are added to the slug at the front (i.e., in the direction of flow) and the rate at which liquids leave the slug at the back. Some slugs grow as they travel the pipeline, while others are damped and disappear before reaching the outlet of the pipeline.

As a non-limiting example, a slug catcher is a vessel with sufficient buffer volume to store the largest slugs expected from the upstream system. The slug catcher is located between the outlet of the pipeline and the processing equipment. Buffered liquids can be drained to the processing equipment at a much slower rate to prevent overloading the system. As slugs are a periodical phenomenon, the slug catcher should be emptied before the next slug arrives.

In one embodiment, the system uses smart wireless nodes incorporating LCT and/or LCT hybrid and one or more sensors. Suitable sensors can include one or more of but not limited to: an accelerometer, an inclinometer, a microphone, salinity, pressure, water current, wave monitoring, turbidity, biofouling build-up and temperature. A flowmeter can monitor the status of the flowline. More than 1 sensor can used data fusion may optionally use with ait to derive improved information on the nature of slugging.

In one embodiment, the slug monitoring system uses sensor data and edge analytics to characterise slugging. This determines one or more of its frequency, duration, peak, and impact on flowline fatigue due to vibration and/or temperature fluctuations. This information may optionally be integrated with one or more other smart devices to provide a system-wide analysis of the phenomenon. In one embodiment, the information derived may be used to monitor the impact of slugging on process efficiency and/or asset integrity. In one embodiment, the system may also be used to monitor the effectiveness of changes to process conditions and/or design to mitigate slugging. An AIoT may be used for optimisation and/or mitigation strategies. In one embodiment the AIoT is be used to change process parameters to mitigate slugging.

Corrosion of metal pipes and other assets in seawater gives rise to substantial costs and can impact safety and the environment. In one embodiment, a DSP corrosion-erosion monitor (CEM) monitors an average wall thickness of pipes, containers and any large object that requires corrosion/erosion monitoring. In one embodiment the CEM system utilizes a method of monitoring wall thickness loss by the use of clamp-on sensors. A number of transducers measure corrosion-erosion transmit ultrasonic signals that propagate through pipe material. By using acoustic transducers no drilling or welding is used that causes loss of production. A topside CEM is an ultrasonic instrument designed to measure wall thickness loss in pipes over a defined area. It uses active ultrasound and exploits the properties of acoustic guided Lambda waves to detect the changes in wall thickness relative to reference values obtained during the installation of the system.

Changes to wall thickness are detected by a grid of signal paths, generated by up to 32 transducers. The permanently installed CEM system ensures that measurements are repeated frequently and in exactly the same manner. This eliminates weaknesses of manual ultrasonic thickness gauging. Wall thickness trends are generated automatically and can be observed in real time.

In one embodiment, the system uses eddy current, a non-contact method. Eddy-current testing, also seen as eddy current testing and ECT, is one of many electromagnetic testing methods used in non-destructive testing (NDT) making use of electromagnetic induction to detect and characterize surface and sub-surface flaws in conductive materials.

As non-limiting examples, impedance spectroscopy and electric field measurement can be used.

In one embodiment, non-contact, multi-frequency magnetic induction spectroscopy (NCMIS) is used to measure the properties of seawater or a fluid. Using fusion to combine the information derived from NCMIS with other sensors including but not limited to temperature, pressure, water flow, density, turbidity, salinity, new or better-quality information on the measurand can be derived.

In one embodiment, a non-contact integrated cathodic protection (ICP) inspection system is used and enables a fast and reliable approach to monitoring the state of cathodic protection (CP) systems on subsea pipelines. By measuring the electric field, the system monitors directly the change in electrical currents in the pipeline due to anodes or damage. This allows for improved monitoring of anode energy remaining. It also predicts anode end of life earlier than stab methods alone and pinpoints problem areas on the pipe that need attention. When combined with camera imaging, multi-beam measurements, synthetic aperture sonar (hiss), and chemical sensors, the ICP system provides a set of measurements for pipeline cathodic protection monitoring and pipeline inspection.

As a non-limiting example, the ICP system provides a speed with which these surveys can be undertaken, along with an increase in sensitivity which is approaching 100 times the sensitivity of the traditional CP survey systems.

In one embodiment, Ocean Floor Geo-physics (OFG) provides numerous magnetic and electric field instruments for remote operated vehicles (ROVs), autonomous underwater vehicles (AUVs) and deep-tow systems. In one embodiment, an electric field measurement system is provided that mounts onto a pipeline inspection AUV.

As a non-limiting example, non-contact wide-frequency-range electrochemical impedance measurements detect corrosion of a steel rebar embedded into concrete. In one embodiment, the measurements were performed by placing two Copper (Cu) sensing electrodes at a distance of 50 mm from each other on the concrete surface immediately above corroded and non-corroded rebar portions. Low-frequency impedance related to the steel rebar/concrete interface was found to be lower in the former case, leading to the detection of corroded portions of steel rebar embedded in concrete.

As a non-limiting example, it is important to select a proper distance between the sensing electrodes for optimal detection of corrosion portions when the cover thickness of reinforced concrete is known.

In one embodiment, one or more corrosion sensor techniques are integrated with an AIoT system incorporating LCT. As non-limiting examples non-contact methods such as, Eddy current, electric field measurement and impedance spectroscopy, NCMIS and the like are integrated with lattice AIoT nodes to measure corrosion and/or the effects of corrosion.

In one embodiment, these technologies all use one or more sub-systems in common with LCT, including but not limited to: coils, magnetic and/or EM pulse generation, sensor, DSP, edge analytics and the like. In one embodiment, more than one corrosion monitoring sensing technology is used. Data fusion can be utilised to derive improved information on the nature, extent and rate of corrosion as well as the impact of mitigation measures.

In one embodiment strain gauges may be used to measure fatigue, vibration and movement and/or temperature. They may be used as an alternative to or to complement accelerometers.

In one embodiment strain gauges may optionally be integrated with a pressure enclosure such that the enclosure becomes an extension of the strain sensor. As a non-limiting example, strain gauges may optionally be glued to the inside wall of an enclosure.

In one embodiment strain gauges may be embedded in the wall of an enclosure and/or end caps using a material deposition processes such as but limited to injection moulding and/or 3D printing and/or glue and/or cement to position and locate the strain gauge and/or strain gauges and or other sensors such that they accurately detect physical parameters such as but not limited to deflection and/or vibration and/or inclination and/or temperature and/or temperature differential and/or interior pressure and/or external pressure and/or material swelling.

In one embodiment stain gauges may alternatively be attached by glue or screw to a backplane than runs the length of the pressure enclosure.

In one embodiment strain gauges may be embedded in one or more backplanes and/or other internal structures using a material deposition processes such as but limited to injection moulding and/or 3D printing and/or glue and/or cement to position and locate the strain gauge and/or strain gauges and or other sensors such that they accurately detect physical parameters such as but not limited to deflection and/or vibration and/or inclination and/or temperature and/or temperature differential and/or interior pressure and/or external pressure and/or material swelling.

In one embodiment the enclosure may be mounted with a suitable mounting system including but not limited to magnetic clamp and/or glue and/or mechanical clamp such that the desired movement is detectable by the strain gauge and/or other sensors.

In one embodiment where resistance gauges are used, a higher resistance device of but not limited to 1 kOhm or more may optionally be used as an alternative to standard devices such as 350 Ohm to reduce power consumption.

In one embodiment where more than one sensor is used, the LCT AIoT device may use data fusion to derive improved information.

pH is most commonly measured using electrochemical techniques. In one embodiment, non-contact techniques may optionally be integrated into an LCT system to measure pH. The speed of sound absorption in seawater at frequencies of <1 khz is known to decrease by 50% for 0.45 pH reduction. In one embodiment change of speed of sound with pH may optionally be measured using two or more microphones. Each measurement node may optionally be configured to generate acoustic signals at a range of frequencies from but not limited to 10 Hz to 30 kHz.

In one embodiment two or more LCT systems may optionally be placed apart at a distance but not limited to 10 cm to 100 m in seawater and configured to measure the speed of sound.

In one embodiment the LCT oscillator circuit and/or the LCT DSP may optionally be adapted to generate the required signal and/or signals and process the sensor data.

In one embodiment data fusion from more than one sensor including but not limited to temperature and/or salinity and/or conductivity and/or turbidity and/or density and/or water current velocity and/or water current direction and/or NCMIS may optionally be used to improve the accuracy and/or repeatability of the pH measurement.

In one embodiment speed of sound measurements may optionally be taken at two or more frequencies and/or from measurements at two or more signal strengths and/or in two or more directions.

In one embodiment data derived from speed of sound measurements may optionally be analysed using two or more filters and/or two or more DSP configurations and/or two or more analytic techniques including but not limited to ML and/or AI to derive improved information including improved accuracy and/or repeatability.

Absorption of sound in seawater forms part of the total transmission loss of sound from a source to a receiver. It depends on the seawater properties, such as temperature, salinity and acidity as well as the frequency of the sound. The details of the underlying physics of absorption are quite complex. Note that the absorption causes only part of the transmission loss. Usually, the major contribution to transmission loss is the spreading of the acoustic wave as it propagates away from the source.

As a non-limiting example, the National Physics Laboratory, UK has developed a calculator to determine the sound absorption in seawater. The calculator uses the following information—the frequency of interest, water temperature, water depth, salinity and pH. The values for the absorption are calculated using three alternative algorithms from the sources specified. When using water other than the Lyman and Fleming standard (s=35, pH=8), the Fisher & Simmons algorithm is invalid. The Francois and Garrison algorithm is estimated to be accurate to within about 5%. For frequencies of 10-500 Khz (where the MgSO4 contribution dominates), the limits of reliability are:

$-2 < t < 22°$ C.
$30 \leq s < 35$ ppt
$0 < d < 3.5$ km

At frequencies greater than 500 Khz, the pure water contribution exceeds that of MgSO4, and the limits are:

$0 < t < 30°$ C.
$0 \leq s < 40$ ppt
$0 < d < 10$ km

The Ainslie and McColm formula retain accuracy to within 10% of the Francois and Garrison model between 100 Hz and 1 MHz for the following range of oceanographic conditions:

$-6 < t < 35°$ C. (s=35 ppt, pH=8, d=0 km)
$7.7 < pH < 8.3$ (t=10° C., s=35 ppt, d=0 km)
$5 \leq s < 50$ ppt (t=10° C., pH=8, d=0 km)
$0 < d < 7$ km (t=10° C., s=35 ppt, pH=8)

In a non-limiting example, an alternative non-contact method of measuring pH is to use a high capacitance microelectromechanical system (MEMS) that uses fringing field capacitive measurements. A change in pH of the medium results in a permittivity change for the fringing electric field, which in turn affects the capacitance values. Capacitance changes are then converted to resonant frequency shifts via a readout circuit. This technique provides high sensitivity, low hysteresis, and low noise as well as low fabrication cost.

In one embodiment the high capacitance MEMS sensor is embedded in the wall of the LCT device such that the sensor is protected by a thin layer of non-metallic material such as but not limited to acetyl and/or polypropylene and/or PEEK.

In one embodiment a MEMS sensor to measure one or more physical parameters such as but not limited to pH and/or temperature and/or vibration and/or conductivity and/or density and/or pressure and/or turbidity and/or biofouling and/or water current is optionally located using a material deposition technique such as but not limited to injection moulding and/or 3D printing.

In one embodiment a MEMS sensor used to measure one or more physical parameters uses one or more electronic components and/or filters and/or signal processing and/or ML and/or AI in common with the LCT AIoT.

In one embodiment a magnetoelastic sensor based on thick film elements coated with pH sensitive material using a piezoelectric crystal is optionally used to measure pH. In response to a magnetic query field the Magnetoelastic sensor mechanically vibrates at a characteristic frequency that is inversely dependent on the mass of attached polymer.

In one embodiment an AIoT node with integrated LCT has one or more sensors including but not limited to magnetoelastic pH sensor.

In one embodiment an AIoT node with integrated LCT with integrated magnetoelastic pH sensor uses one or more components and/or subsystems in common with the LCT and magnetoelastic pH sensor including but not limited to oscillator and/or filter and/or amplifier and/or DSP.

In one embodiment acoustic doppler current profiler is commonly used to measure currents. It is normally deployed on the seafloor or attached to the bottom of a boat. It sends an acoustic signal into the water column and that sound bounces off particles in the water. The instrument can calculate the speed and direction of the current by knowing the frequency of the return signal, the distance it travelled, and the time it took for the signal to travel.

In one embodiment an AIoT node with integrated LCT incorporates one or more sensors for measuring water current including but not limited to wind vane and/or underwater electromagnetic flow meters.

In one embodiment an underwater a 'wind vane' that uses a screw may be used to measure current and a vane to measure direction In one embodiment the Valeport model 106 is an instrument for coastal and estuarine applications and other light-duty survey work. The instrument is manufactured from titanium and polymers, giving resistance to corrosion, whilst maintaining a small size and low weight. Utilising the standard Valeport 125 mm diameter impeller, the model 106 features speed and direction parameters as standard, with further options of temperature and depth. data (logged or real time) is compatible with Valeport's data Log™ software.

In one embodiment the Electromagnetic (EM) flowmeter may be used to measure water current.

In one embodiment the Valeport model 803 which was designed for use on ROVs and other underwater vehicles, provides real-time relative water velocity information for pilots.

In one embodiment the Model 803 may be fitted to ROVs to provide actual through the water speeds, or fitted to tether management systems to give the measurement of local flow conditions.

In one embodiment the Model 803 measurements are updated every second and the Rovlog™ software provides a graphic and data display and enables data to be logged to disk.

In one embodiment a flexible strain sensor is optionally used to measure water current and direction. It is a low cost and flexible method that can be integrated with a LCT AIoT system. The strain sensor bending is proportional to water current and the direction of bend provides information on current direction.

In one embodiment the strain sensor is coated in a light flexible plastic material such as polypropylene using 3d print or moulding.

In one embodiment a Lattice LCT AIOT node may be used to measure water current where an EM sensor such as a Valeport Model 803 is integrated. The LCT node may optionally use data analytics, DSP, ML and/or AI to process sensor data such that only key information on change of status is transferred across the Lattice link.

In one embodiment retrofit offshore jacket fatigue monitoring system comprises a wireless data communications system incorporating LCT and one or more of free-space optical communications, acoustic communications and/or radio communications configured with an EM or vane water current sensor as non-limiting examples Valeport Model 803 or a Valeport Model 103 and/or a pressure sensor based wave height measurement sensor as non-limiting example a Valeport Midas DWR directional wave recorder and/or an accelerometer to monitor movement of the structure such as a lower power MEMS device as non-limiting examples Analogue Devices ADXL355 and/or ST IIS2ICLX and/or strain sensors and/or piezo-electric sensors attached to the structure wherein data from the various sensors may optionally be analysed individually and/or optionally be fused to derive information on the response of the structure to prevailing weather and/or water current conditions and/or using a digital twin and/or one or more predictive models to assess the residual fatigue life of the structure which information is transferred by wireless link to a node located above water.

In one embodiment build-up of biofouling may also be measurable using AIoT by monitoring change in behaviour over time.

In one embodiment turbidity sensors are typically optical devices that measure attenuation of light in water. This is not practical for long term measurement in shallow water subject to biofouling.

In one embodiment turbidity is the cloudiness or haziness of a fluid caused by large numbers of individual particles that are generally invisible to the naked eye, similar to smoke in air. The measurement of turbidity is a key test of water quality. Fluids can contain suspended solid matter consisting of particles of many different sizes. While some suspended material will be large enough and heavy enough to settle rapidly to the bottom of the container if a liquid sample is left to stand (the settable solids), very small particles will settle only very slowly or not at all if the sample is regularly agitated or the particles are colloidal. These small solid particles cause the liquid to appear turbid. Turbidity (or haze) is also applied to transparent solids such as glass or plastic. In plastic production, haze is defined as the percentage of light that is deflected more than 2.5° from the incoming light direction.

In one embodiment his invention proposed the optional use of non-contact methods to measure turbidity that can be integrated with a LCT AIoT system.

In one embodiment the magnetohydrodynamic (mhd) pump ionise water and use field to force to flow through a coil. Water density is proportional to energy needed. The force detected is proportional to density. A small coil may be externally mounted and may optionally incorporate a strain sensor to measure force.

In one embodiment a resonant piezoelectric or linear actuator is configured to move an external 'wing'. The energy required to resonate the wing is proportional to density.

In one embodiment, system 10 is used for low-cost subsea enclosures. Subsea enclosures are often an expensive subsystem in many subsea electronic systems. Subsea enclosures are commonly manufactured from stainless steel, aluminium or titanium. They typically incorporate end caps with a single or double O-ring seal. More recently, non-metallic materials such as Acetyl, Delrin, PEEK, PET PA6, PA12, polypropylene, glass and fibreglass have been used as an alternative to metal enclosures. Non-metallic materials have the advantage of not blocking EM and magnetic communications and/or power transfer.

In one embodiment, commercially available non-metallic tubes are not a good solution for subsea enclosures with O-ring end cap. This is because the standard tolerances on commercial tubes are too great. In order to meet the tolerance requirements, O-ring enclosures are machined from solid material or tubes are machined to a defined tolerance. The cost of such systems remains dominated by the cost of machining end caps to the tight tolerances required for O-rings.

In one embodiment, an alternative to air-filled subsea enclosures is to pot with a potting compound to remove all air or to fill with oil. Oil filled systems require good seals and are expensive to manufacture. Both oil and potted systems place high pressures on internal components requiring common components such as crystals and electrolytic capacitors which contain air inclusions to be designed out.

This invention uses a novel approach to the use of potting materials to create reliable, low-cost air-filled subsea enclosure.

In one embodiment, system 10 is based around low cost, commercial off-the-shelf tubes. Once electronics and batteries have been integrated and tested, the tube may be sealed for life using potting. To improves the reliability and strength of the potted end caps, one or more holes may be drilled through the wall near each end and/or groves marked on the inside and/or outside. In one embodiment, each end is lowered into a mould and held typically 1-2 cm above the bottom of the mould and potting compound introduced to form a seal that extends typically 1-3 cm along the length of the tube. The potted enc cap may typically be 2-6 cm in length. Where holes have been drilled through the tube wall near the end, potting compound penetrates these holds to form a continuous solid link between the inside and outside. This strengthens the seal.

In one embodiment, groves have been marked on the inside and/or outside of the tube these to assist with strengthening the seal. Groves can be cut in the shape of a screw. This may facilitate removing the end cap to provide access to interior parts. Where a removable potted screw end cap is required, grub screws may be used to prevent accidental or inadvertent movement or rotation of an end cap. The ends cap can be coated with a suitable lubricant before potting to facilitate subsequent removal.

In one embodiment, the inside of the tube is roughened using as a non-limiting example sandpaper. This provides a surface against which the potting material can form a strong seal. The potting material may be applied such that it is flush with the end of the tube or the end of the tube may be lowered into a mould so that potting material forms a plug both on the inside and outside of the tube.

In one embodiment, both the inside and outside of the tube are roughened using as a non-limiting example sandpaper. The end of the tube may be lowered into a mould so that potting material forms a plug both on the inside and outside of the tube.

In one embodiment, the end cap is designed so that wires and/or other protrusions gain access from the interior without adversely impacting the seal. As a non-limiting example, an acetyl tube of internal diameter (ID) 40 mm and outside diameter (OD) 60 mm is used. This is suitable for depth ratings of 200 m and in circumstances may be suitable for up to 500 m. Alternative OD and IDs and alternative materials may be used for greater depth ratings.

In one embodiment, system 110 is a Lattice LCT system supplied in a cylindrical subsea enclosure. A coil can be internal, on a ferrite rod, or external. When an external coil is used wires from the system electronics are run through the potting of one end cap. In one embodiment, the coil can have separate wiring for source and sink. In one embodiment, wire is of low resistance, such as copper, and insulated. As a non-limiting example, the sink and source coils can be positioned next to each other in a channel which forms a circle, square, rectangle or other shape, as required. In one embodiment, the coils are surrounded by air which is then displaced by water or they are potted in place to displace the air. A top cap may optionally be used for one or more of to hold the coil in place, to provide structural strength and to improve design aesthetics.

As a non-limiting example, the depth rated enclosure can extend the full diameter of the coil and interconnect with the coil using a shaped 'saddle'. As non-limiting examples the saddle may be manufactured from injection mould or printed using 3d systems or machined.

In one embodiment, the LCT system incorporates acoustic and/or optical comms systems. The transducers are integrated into one or both saddles.

When the LCT coil is internal, acoustic and/or optical comms transducers may be integrated into one or both end caps. When an external coil is used, the coil may be made of two or more interlocking plastic sections manufactured from 3d printing or injection moulding or machining. The material of the coil maybe polypropylene or nylon or acetyl or another stable material. The enclosure may be coated to reduce biofouling and/or manufactured from materials that reduce the impact of biofouling.

As a non-limiting example, the information is one of a number of forms including but not limited to one or more of progress against predictive behaviour of
 Corrosion
 Fatigue
 Temperature
 Flow
 Environment
 Water current
 Temp
 pH
 turbidity
 salinity/conductivity
 biofoul growth
 pollutants
Thus, the information will seek to 'correct' predictive models, most of which will be curves (eg y=mx+c, where m is corrected over time)

The information may also include exceptional events
In one embodiment, there are two memory repositories
 data: where most or all raw data is stored (incl preprocessed and part processed)
 information: where predictive models and the resultant output of these models is stored
Subsea Electronics Module
 Subsea computer: a computer in a marinized enclosure
 Industrial I/O to monitor sensors (e.g., pressure, temp etc) and optionally to control devices (e.g., valve)
 Umbilical between SEM and 'top-side' carrying power and comms.
 SEM has a number of 'ports' for I/O.
 These ports typically support one or more standard industrial protocols such as RS232, MODBUS, CANB US, ETHERNET etc
 A standard 'hard-wired' port provides a 'jumper' link to one or more sensors such as temp, pressure etc
 The proposed solution converts 1 or more SEM ports to wireless ports (similar to Bluetooth or WiFi). The wireless port produces energy in the form of a LCT link which can be used for one or more of information transfer and energy transfer
 Hybrid
 SEM ports could be
 Hardwired
 LCT
 Multi-comms e.g., LCT and/or Bluetooth and/or Acoustic etc
 The Hybrid CSS is either
 Hardwired to the SEM I/O port or
 Wirelessly connected to the SEM using Bluetooth and/or WiFi and/or LCT etc
 Remote CSS is a sensor or device integrated with LCT. The sensor may be 10 m away or more from the SEM i.e., 'remote'
 'Receiver': we can't use this term if referring to LCT sink—prefer
 'transducer to detect an external signal'
 Each remote CSS converts sensor data to information using edge algorithms, digital twins and other modelling techniques. This information is wirelessly transferred to the SEM. Note the SEM will transfer commands and other information to remote CSSs. Information is modulated using a Modulator LCT alone Is sufficient. See pg 59 for definition of impulsive interference.

It is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A compact surveillance system (CSS) comprising:
 a power source configured to provide power to the system;
 a power input coupled to the power source and configured to provide power to the system;

one or more sensors configured to measure a measurand;
a Loosely Coupled Transformer (LCT) transducer coupled to the one or more sensors and the power source, the LCT configured to receive an external signal and convert the external signal to an electrical signal; and
a processor in electrical or magnetic communication with the one or more sensors, the processor configured to process the electrical signal, generate information relative to one or more of progress against predictive behaviour of selected from one or more of: corrosion; fatigue; temperature; flow and environment;
a subsea electronics module (SEM) coupled to the LCT;
at least one of an SEM available port and a wireless link; and
the LCT including at least one of: an intelligent antenna and impulsive interference suppression and software defined radio and adaptive radio;
at least one of: a continuous and duty cycle control of communications link;
and a duty cycle control of communications link; and
at least a portion of the information including progress against predictive behaviour of one or more of: corrosion; fatigue, temperature, flow, environment; water current; environment; water current; pH; turbidity; salinity, conductivity; and biofoul growth; and pollutants.

2. The system of claim 1, wherein the information is not compressed.

3. The system of claim 1, wherein the transducer is positioned to enable a transfer to pass through one or more of a fluid boundary and a solid boundary.

4. The system of claim 1, wherein the transducer is positioned such that a communication channel is indirect.

5. The system of claim 1, further wherein, the processor adapts the duty cycle provides for control of information using a minimum of two transfer methods.

6. The system of claim 1, further comprising:
a secure passive monitoring system that uses at least two frequencies and at least one tone.

7. The system of claim 1, further comprising: one or more of encryption, information masking, information erasure, information resilience, and information authentication.

8. The system of claim 1, further comprising: an information network that uses one or more of: edge computing and a hybrid cloud.

9. The system of claim 1, wherein analytic models are used to provide surveillance information.

10. A compact surveillance system (CSS) including:
a power source configured to provide power to the system;
a power input coupled to the power source and configured to provide power to the system;
one or more sensors configured to measure a measurand;
a Loosely Coupled Transformer LCT coupled to the one or more sensors and the power source, the LCT configured to receive an external signal and convert the external signal to an electrical signal;
a processor in electrical or magnetic communication with the one or more sensors, the processor configured to process the electrical signal, generate information relative to one or more of progress against predictive behaviour of selected from one or more of: corrosion; fatigue; temperature; flow and environment; a subsea electronics module coupled to the LCT;
at least one of an SEM available port and a wireless link;
the CSS having with at least one of transmitters, two or more of: radio, Magneto-Inductive (MI), Cognitive radio (CR), acoustic, LCT and MI and a smart LCT including at least one of: an intelligent antenna, impulsive interference suppression and software defined by radio and adaptive radio;
at least one of: a continuous and duty cycle control of a communications link; and
at least a portion of the information including progress against predictive behaviour of one or more of: corrosion; fatigue, temperature, flow, environment; water current; environment; water current; pH; turbidity; salinity; conductivity; and biofoul growth; and pollutants.

11. The system of claim 10, wherein the system includes: one or more of: LCT, radio, cognitive radio, magneto-inductive, optical, acoustic and dielectric resonant communications.

12. The system of claim 10, wherein the information is not compressed.

13. The system of claim 10, wherein the LCT is positioned to enable a part of a transfer to pass through one of a fluid boundary or a solid boundary.

14. The system of claim 10, wherein the LCT is positioned such that a primary communications channel is indirect.

15. The system of claim 10, wherein the system includes a secure passive monitoring system with at least two frequencies and at least one tone length that is detectable using a limiting comparator circuit for activation of the processor.

16. The system of claim 10, wherein the system includes: an information network with a minimum of three systems, wherein the information network incorporates a minimum of one of edge computing and hybrid cloud.

17. A temperature gradient compact surveillance system (TG CSS) comprising:
a power source configured to provide power to the system;
a power input coupled to the power source and configured to provide power to the system;
two or more temperature gradient (TG) sensors with a thermal conductivity along a length of each TG sensor;
a modulator for modulating information onto a carrier signal,
a Loosely Coupled Transformer (LCT) transducer coupled to the one or more sensors and the power source, the LCT configured to receive an external signal and convert the external signal to an electrical signal;
a processor in electrical or magnetic communication with the one or more sensors, the processor configured to process the electrical signal, generate information relative to one or more of progress against predictive behaviour of selected from one or more of: corrosion; fatigue; temperature; flow and environment;
a wireless information transfer system with: radio, Cognitive radio (CR), acoustic and optical; and
at least a portion of the information including progress against predictive behaviour of one or more of: corrosion; fatigue, temperature, flow, environment; water current; environment; water current; pH; turbidity; salinity; conductivity; and biofoul growth; and pollutants.

18. A compact surveillance system, comprising:
a power source configured to provide power to the system;
a power input coupled to the power source and configured to provide power to the system;

one or more sensors configured to measure a measurand;

a Loosely Coupled Transformer LCT coupled to the one or more sensors and the power source, the LCT configured to receive an external signal and convert the external signal to an electrical signal;

a processor in electrical or magnetic communication with the one or more sensors, the processor configured to process the electrical signal, generate information relative to one or more of progress against predictive behaviour of selected from one or more of: corrosion; fatigue; temperature; flow and environment;

a modulator for modulating information onto a carrier signal; a wireless transfer system with one of radio, MI, CR, acoustic and optical;

the CSS using the one or more sensors to gather data and one of: an LCT, oscillator, modulator and Digital Signal Processing (DSP) to process the data and/or communicate the data with other CSS in the surveillance system; and at least a portion of the information including progress against predictive behaviour of one or more of: corrosion; fatigue, temperature, flow, environment; water current; environment; water current; pH; turbidity; salinity: conductivity; and biofoul growth; and pollutants.

* * * * *